(12) United States Patent
Tsuchizawa et al.

(10) Patent No.: US 11,584,473 B2
(45) Date of Patent: Feb. 21, 2023

(54) SUSPENSION CONTROL DEVICE FOR A HUMAN-POWERED VEHICLE

(71) Applicant: Shimano Inc., Osaka (JP)

(72) Inventors: Yasuhiro Tsuchizawa, Osaka (JP); Takuya Katsuki, Osaka (JP); Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 119 days.

(21) Appl. No.: 16/038,246

(22) Filed: Jul. 18, 2018

(65) Prior Publication Data

US 2020/0023703 A1 Jan. 23, 2020

(51) Int. Cl.
| | |
|---|---|
| *B62K 25/08* | (2006.01) |
| *B60G 17/005* | (2006.01) |
| *B62J 45/41* | (2020.01) |
| *B62J 45/423* | (2020.01) |
| *B60G 17/015* | (2006.01) |
| *B62K 25/04* | (2006.01) |

(52) U.S. Cl.
CPC ............ *B62K 25/08* (2013.01); *B60G 17/005* (2013.01); *B62J 45/41* (2020.02); *B62J 45/423* (2020.02); *B60G 17/0152* (2013.01); *B60G 2204/46* (2013.01); *B60G 2300/12* (2013.01); *B62K 2025/044* (2013.01); *B62K 2025/047* (2013.01)

(58) Field of Classification Search
CPC .............. B60G 17/005; B60G 17/0152; B60G 2300/12; B60G 2204/46; B62J 45/40; B62K 25/30; B62K 25/08; B62K 2025/044; B62K 2025/047
See application file for complete search history.

(56) References Cited

U.S. PATENT DOCUMENTS

| | | | | |
|---|---|---|---|---|
| 5,211,420 A | * | 5/1993 | Iwashita | B60G 15/063 180/219 |
| 5,320,375 A | * | 6/1994 | Reeves | B62K 25/30 188/282.1 |
| 5,921,572 A | * | 7/1999 | Bard | B60G 17/0152 280/284 |
| 5,971,116 A | * | 10/1999 | Franklin | B60G 17/0152 188/266.2 |
| 6,336,648 B1 | | 1/2002 | Bohn | |
| 6,863,291 B2 | | 3/2005 | Miyoshi | |
| 8,356,829 B2 | | 1/2013 | Shirai | |
| 8,489,277 B2 | | 7/2013 | Hara et al. | |
| 8,755,969 B2 | | 6/2014 | Ichida et al. | |
| 8,781,680 B2 | | 7/2014 | Ichida et al. | |

(Continued)

FOREIGN PATENT DOCUMENTS

| | | |
|---|---|---|
| EP | 2 357 098 A2 | 8/2011 |
| WO | 2018/016540 A1 | 1/2018 |

OTHER PUBLICATIONS

Fox Suspension Literature, Available prior Jul. 2018.

*Primary Examiner* — Frank B Vanaman
(74) *Attorney, Agent, or Firm* — Global IP Counselors, LLP

(57) ABSTRACT

A suspension control device is provided for a human-powered vehicle. The suspension control device includes a sensor and an electronic controller. The sensor is configured to detect information relating to a ground contact condition. The electronic controller is configured to selectively control a suspension of the human-powered vehicle in accordance with the information detected by the sensor.

10 Claims, 8 Drawing Sheets

(56) References Cited

U.S. PATENT DOCUMENTS

| | | | |
|---|---|---|---|
| 9,199,690 B2 | 12/2015 | Watarai | |
| 2006/0060750 A1* | 3/2006 | Alexandridis | B60G 17/0152 |
| | | | 248/588 |
| 2009/0120210 A1* | 5/2009 | Phillips | B62M 3/00 |
| | | | 73/862.338 |
| 2011/0202236 A1 | 8/2011 | Galasso et al. | |
| 2012/0136537 A1 | 5/2012 | Galasso et al. | |
| 2012/0186922 A1* | 7/2012 | Battlogg | B62K 25/04 |
| | | | 188/267.1 |
| 2015/0183486 A1 | 7/2015 | Watarai | |
| 2016/0069411 A1 | 3/2016 | Galasso et al. | |
| 2018/0304952 A1* | 10/2018 | Krugman | B62J 99/00 |
| 2019/0016409 A1* | 1/2019 | Tetsu | B62K 25/08 |
| 2019/0054780 A1* | 2/2019 | Nichols | B60C 23/0494 |

\* cited by examiner

| CONTROL USING DETECTION RESULTS OF MULTI-AXIS ACCELERATION SENSORS | | |
|---|---|---|
| Traveling State | LOCKOUT OFF | Determination Condition |
| Traveling Off-Road | Front And Rear Suspensions | Front And Rear Vertical Acceleration Values Are Fluctuating Above Predetermined Threshold Value (e.g., Gravity: 9.81 m/s$^2$) Within Predetermined Period |
| During Jumping | Front And Rear Suspensions | Front And Rear Vertical Acceleration Values Decrease Below Predetermined Threshold Value (e.g., Gravity: 9.81 m/s$^2$). |
| During Wheelie | Only Front Suspension(s) | Front Vertical Acceleration Value Decreases Below Predetermined Threshold Value (e.g. Gravity: 9.8 m/s$^2$), And Forward Acceleration On Rear Side Becomes Less Than Predetermined Threshold Value. |
| During Jack Knife | Only Rear Suspension(s) | Rear Vertical Acceleration Value Decreases Below Predetermined Threshold Value (e.g. Gravity: 9.81 m/s$^2$), And Forward Acceleration On Front Side Becomes Not More Than Predetermined Threshold Value. |

FIG. 3

| VERTICAL ACCELERATION STATE | | REAR | | |
|---|---|---|---|---|
| | | Above The Predetermined Threshold Value | Below The Predetermined Threshold Value | Other Values |
| FRONT | Above The Predetermined Threshold Value | Change Present Off-Road State<br>- Front: LOCKOUT OFF<br>- Rear: LOCKOUT ON | Change Present Jack Knife Prior State | No Change |
| | Below The Predetermined Threshold Value | Change Present Wheelie State | Change Present Jumping State<br>- Front: LOCKOUT OFF<br>- Rear: LOCKOUT OFF | Change Present Wheelie State Prior State |
| | Other Values | No Change | Change Present Jack Knife State | Change Present Traveling On-Road State<br>- Front: LOCKOUT ON<br>- Rear: LOCKOUT ON |

FIG. 4

| FORWARD VELOCITY STATE | | REAR | | |
|---|---|---|---|---|
| | | Above The Predetermined Threshold Value | Below The Predetermined Threshold Value | Other Values |
| FRONT | Above The Predetermined Threshold Value | No Change | Change Present Wheelie State<br>- Front: LOCKOUT OFF<br>- Rear: LOCKOUT ON | No Change |
| | Below The Predetermined Threshold Value | Change Present Jack Knife State<br>- Front: LOCKOUT OFF<br>- Rear: LOCKOUT ON | Change Present Jack Knife State<br>- Front: LOCKOUT OFF<br>- Rear: LOCKOUT ON<br><br>Wheelie State<br>- Front: LOCKOUT OFF<br>- Rear: LOCKOUT ON | Change Present Jack Knife State<br>- Front: LOCKOUT OFF<br>- Rear: LOCKOUT ON |
| | Other Values | No Change | Change Present Wheelie State<br>- Front: LOCKOUT OFF<br>- Rear: LOCKOUT ON | No Change |

FIG. 5

| CONTROL USING DETECTION RESULTS OF TIRE AIR PRESSURE SENSORS |||
|---|---|---|
| Traveling State | LOCKOUT OFF | Determination Condition |
| Traveling Off-Road | Front And Rear Suspensions | Air Pressures In The Front And Rear Tires Become Equal To Or Exceed Than Predetermined Threshold Value (Or Occurs Several Times). |
| During Jumping | Front And Rear Suspensions | Air Pressures In The Front And Rear Tires Below Predetermined Threshold Value (e.g., Ground Contact Pressure Value). |
| During Wheelie | Only Front Suspension(s) | Air Pressure In The Front Tire(s) Below Predetermined Threshold Value (e.g., Ground Contact Pressure Value). |
| During Jack Knife | Only Rear Suspension(s) | Air Pressure In The Rear Tire(s) Below Predetermined Threshold Value (e.g., Ground Contact Pressure Value). |

FIG. 7

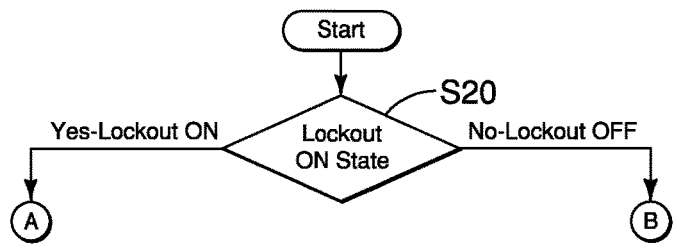

FIG. 8

| CONTROL USING DETECTION RESULTS OF SUSPENSION LOAD (HYDRAULIC/AIR PRESSURE) SENSORS | | |
|---|---|---|
| Traveling State | LOCKOUT OFF | Determination Condition |
| Traveling Off-Road | Front And Rear Suspensions | Load (Hydraulic Or Air Pressure) Of Front And Rear Suspension(s) Exceeds Equal To Or Higher Than Predetermined Threshold Value (Or Occurs Several Times). |
| During Jumping | Front And Rear Suspensions | Load (Hydraulic Or Air Pressure) Of Front And Rear Suspension(s) Below Predetermined Threshold Value (e.g., No-Load Condition Value). |
| During Wheelie | Only Front Suspension(s) | Load (Hydraulic Or Air Pressure) Of The Front Suspension(s) Below Predetermined Threshold Value (e.g., No-Load Condition Value). |
| During Jack Knife | Only Rear Suspension(s) | Load (Hydraulic Or Air Pressure) Of The Rear Suspension(s) Below Predetermined Threshold Value (e.g., No-Load Condition Value). |

FIG. 11

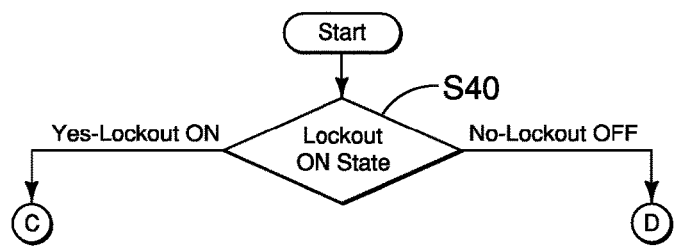

FIG. 12

SUSPENSION CONTROL DEVICE FOR A HUMAN-POWERED VEHICLE

BACKGROUND

Field of the Invention

The present invention generally relates to a suspension control device for a human-powered vehicle.

Background Information

Some human-powered vehicles, in particular bicycles, have been provided with one or more suspensions to absorb the shock that would have been transmitted to the rider when riding on rough surfaces. In recent years, suspension control devices have been proposed to control a state of the suspension(s) based on an operating state of the bicycle.

SUMMARY

Generally, the present disclosure is directed to various features of a suspension control device for a human-powered vehicle. Human-powered vehicle vehicles as used here in refers to vehicles regardless of the number of their wheels, that are power by a human and not by a motor or engine.

In one feature, a suspension control device is provided that selectively controls a suspension of a human-powered vehicle in accordance with information relating to a ground contact condition.

In view of the state of the known technology and in accordance with a first aspect of the present disclosure, a suspension control device is provided for a human-powered vehicle. The suspension control device basically comprises a sensor and an electronic controller. The sensor is configured to detect information relating to a ground contact condition. The electronic controller is configured to selectively control a suspension of the human-powered vehicle in accordance with the information detected by the sensor. With the suspension control device according to the first aspect, it is possible to improve the riding comfort and the running performance of the human-powered vehicle.

In accordance with a second aspect of the present disclosure, the suspension control device according to the first aspect is configured so that the electronic controller is configured to selectively control a lockout state of the suspension in accordance with the information. With the suspension control device according to the second aspect, it is possible to improve the running performance of the human-powered vehicle by locking the suspension in accordance with the ground contact condition.

In accordance with a third aspect of the present disclosure, the suspension control device according to the first or second aspect is configured so that the lockout state includes a lockout ON state and a lockout OFF state, and the electronic controller is configured to selectively set the lockout state with the lockout OFF state in accordance with the information. With the suspension control device according to the third aspect, it is possible to selectively set the lockout state between a lockout ON state and a lockout OFF state in accordance with the ground contact condition.

In accordance with a fourth aspect of the present disclosure, a suspension control device is provided for a human-powered vehicle. The suspension control device basically comprises a sensor and an electronic controller. The sensor is configured to detect information relating to at least one of a road surface condition and a ground contact condition. The electronic controller is configured to selectively set a lockout state of a suspension of the human-powered vehicle with a lockout OFF state in accordance with the information detected by the sensor. With the suspension control device according to the fourth aspect, it is possible to improve the riding comfort and the running performance of the human-powered vehicle.

In accordance with a fifth aspect of the present disclosure, the suspension control device according to the fourth aspect is configured so that the road surface condition relates to a vertical acceleration of the human-powered vehicle, and the electronic controller is configured to set the lockout state with the lockout OFF state in accordance with a comparison between the vertical acceleration and a predetermined threshold value. With the suspension control device according to the fifth aspect, it is possible to appropriately set the suspension for off-road traveling, or when landing on a hard road surface after a jump, a wheelie or a jack knife.

In accordance with a sixth aspect of the present disclosure, the suspension control device according to the fourth or fifth aspect is configured so that the road surface condition relates to a forward velocity of the human-powered vehicle, and the electronic controller is configured to set the lockout state with the lockout OFF state in accordance with a comparison between the forward velocity and a predetermined threshold value. With the suspension control device according to the sixth aspect, it is possible to appropriately set the suspension for off-road traveling, or when landing on a hard road surface after a jump, a wheelie or a jack knife.

In accordance with a seventh aspect of the present disclosure, the suspension control device according to any one of the third to sixth aspects is configured so that the ground contact condition relates to a load of a front wheel of the human-powered vehicle, and the electronic controller is configured to set the lockout state with the lockout OFF state upon determining the load is equal to or less than a predetermined threshold value. With the suspension control device according to the seventh aspect, it is possible to appropriately determine that the front tire of the human-powered vehicle is no longer contacting the ground.

In accordance with an eighth aspect of the present disclosure, the suspension control device according to the seventh aspect is configured so that the sensor is configured to detect an air compression of a front tire attached to the front wheel as the load of the front wheel. With the suspension control device according to the eighth aspect, it is possible to easily determine whether the front tire of the human-powered vehicle is contacting the ground or not.

In accordance with a ninth aspect of the present disclosure, the suspension control device according to the seventh aspect is configured so that the suspension includes a front suspension, and the sensor is configured to detects a load of the front suspension as the load of the front wheel. With the suspension control device according to the ninth aspect, it is possible to appropriately determine that the roughness of the ground that the human-powered vehicle is traveling on.

In accordance with a tenth aspect of the present disclosure, the suspension control device according to any one of the third to ninth aspects is configured so that the ground contact condition relates to a load of a rear wheel of the human-powered vehicle, and the electronic controller is configured to set the lockout state with the lockout-OFF state upon determining the load is equal to or less than a predetermined threshold value. With the suspension control device according to the tenth aspect, it is possible to appropriately determine that the rear tire of the human-powered vehicle is no longer contacting the ground.

In accordance with an eleventh aspect of the present disclosure, the suspension control device according to the tenth aspect is configured so that the sensor is configured to detect an air compression of a rear tire attached to the rear wheel as the load of the rear wheel. With the suspension control device according to the eleventh aspect, it is possible to easily determine whether the rear tire of the human-powered vehicle is contacting the ground or not.

In accordance with a twelfth aspect of the present disclosure, the suspension control device according to the tenth aspect is configured so that the suspension includes a rear suspension, and the sensor is configured to detect a load of the rear suspension as the load of the rear wheel. With the suspension control device according to the twelfth aspect, it is possible to appropriately determine that the roughness of the ground that the human-powered vehicle is traveling on.

In accordance with a thirteenth aspect of the present disclosure, the suspension control device according to any one of the third to twelfth aspects is configured so that the ground contact condition relates to a vertical acceleration of a front wheel of the human-powered vehicle, and the electronic controller is configured to set the lockout state with the lockout OFF state in accordance with a comparison between the vertical acceleration of the front wheel and a predetermined threshold value.

With the suspension control device according to the thirteenth aspect, it is possible to appropriately set the suspension upon determining a wheelie state exists.

In accordance with a fourteenth aspect of the present disclosure, the suspension control device according to any one of the third to thirteenth aspects is configured so that the ground contact condition relates to a vertical acceleration of a rear wheel of the human-powered vehicle, and the electronic controller is configured to set the lockout state with the lockout OFF state in accordance with a comparison between the vertical acceleration of the rear wheel and a predetermined threshold value. With the suspension control device according to the fourteenth aspect, it is possible to appropriately set the suspension upon determining a jack knife state exists.

Also, other objects, features, aspects and advantages of the disclosed suspension control device will become apparent to those skilled in the art from the following detailed description, which, taken in conjunction with the annexed drawings, discloses preferred embodiments of the suspension control device.

BRIEF DESCRIPTION OF THE DRAWINGS

Referring now to the attached drawings which form a part of this original disclosure.

FIG. 3 is a prestored control illustrated as a control table that is executed by an electronic controller of the suspension control device using front and rear multi-axis acceleration sensors for determining a traveling state and controlling an operating state of the front and rear suspensions of the human-powered vehicle of FIG. 1;

FIG. 4 is prestored vertical acceleration status determination table that is executed by the electronic controller of the suspension control device based on vertical acceleration states of the front and rear portions of the human-powered vehicle for controlling the operating state of the front and rear suspensions of the human-powered vehicle of FIG. 1;

FIG. 5 is a forward velocity status determination table that is executed by the electronic controller of the suspension control device based on forward velocity states of the front and rear portions of the human-powered vehicle for controlling the operating state of the front and rear suspensions of the human-powered vehicle of FIG. 1;

FIG. 7 is a prestored control illustrated as a control table that is executed by the electronic controller of the suspension control device using front and rear load (air pressure) sensors for determining a traveling state and controlling an operating state of the front and rear suspensions of the human-powered vehicle of FIG. 1;

FIG. 8 is a first part of a flowchart of an automatic suspension control executed by the electronic controller of the suspension control device in which the electronic controller determines if one of the front and rear suspensions is in a lockout ON state or a lockout OFF state;

FIG. 11 is a prestored control illustrated as a control table that is executed by the electronic controller of the suspension control device using front and rear suspension load (air or fluid pressure) sensors for determining a traveling state and controlling an operating state of the front and rear suspensions of the human-powered vehicle of FIG. 1;

FIG. 12 is a first part of a flowchart of an automatic suspension control executed by the electronic controller of the suspension control device in which the electronic controller determines if one of the front and rear suspensions is in a lockout ON state or a lockout OFF state;

DETAILED DESCRIPTION OF EMBODIMENTS

Selected embodiments will now be explained with reference to the drawings. It will be apparent to those skilled in the human-powered vehicle (e.g., bicycle) field from this disclosure that the following descriptions of the embodiments are provided for illustration only and not for the purpose of limiting the invention as defined by the appended claims and their equivalents.

Figure 1:
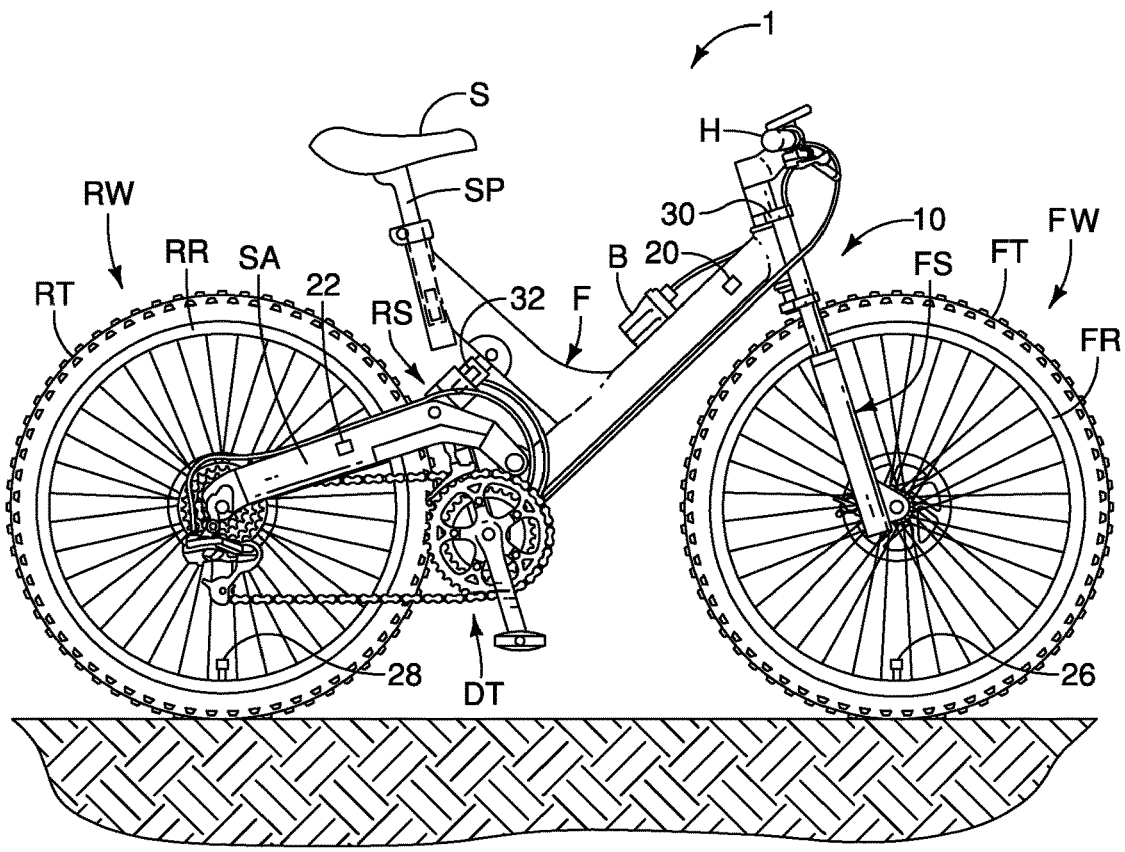
FIG. 1 is a side elevational view of a human-powered vehicle (e.g., a bicycle) having a front suspension and a rear suspension that are controlled by a suspension control device in accordance with one embodiment.
Figure 2:
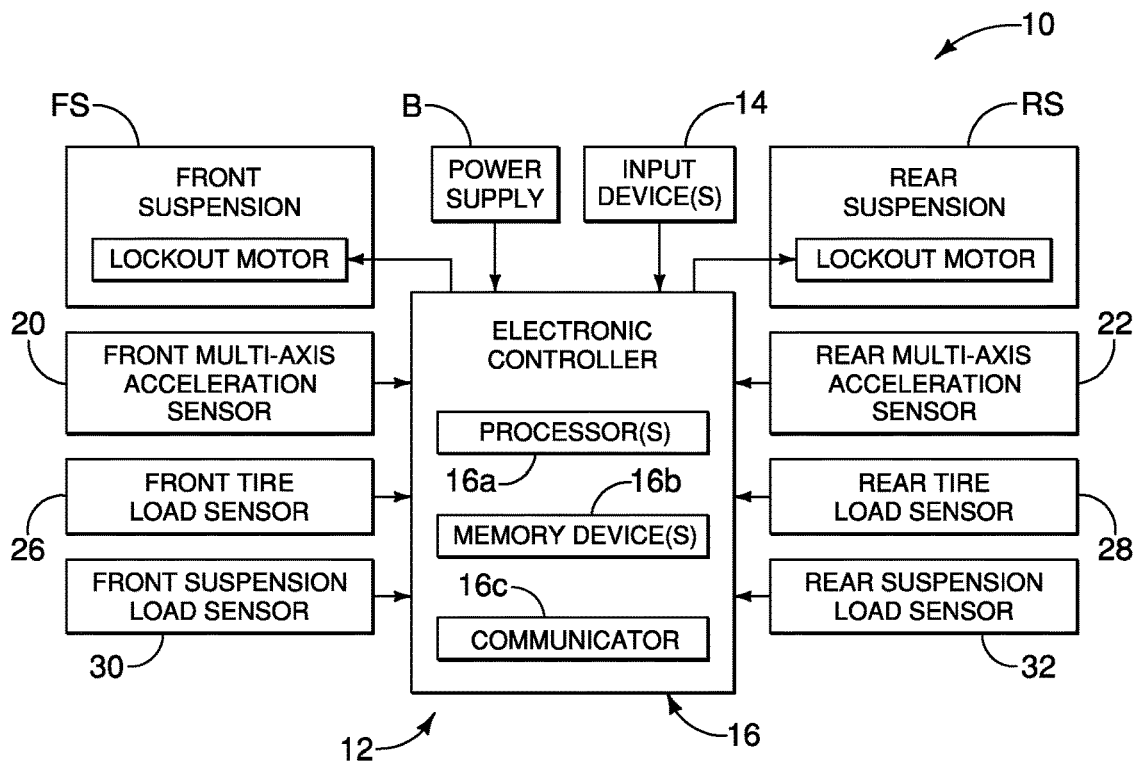
FIG. 2 is a block diagram illustrating a human-powered vehicle (e.g., a bicycle) suspension assembly including the suspension control device and the front and rear suspensions of the human-powered vehicle of FIG. 1.

Referring initially to FIGS. 1 and 2, a human-powered vehicle 1 is illustrated that is equipped with a human-powered vehicle (e.g., a bicycle) suspension assembly 10 that includes a suspension control device 12 in accordance with one embodiment. As seen in FIG. 1, the suspension control device 12 is for the human-powered vehicle 1. While the human-powered vehicle 1 is illustrated as a bicycle, it will be apparent that the suspension control device 12 can be used with other human-powered vehicles that include a suspension.

The human-powered vehicle 1 includes a bicycle body having a main frame F, a front suspension FS and a swing arm SA. The front suspension FS is a front suspension fork that is pivotally mounted to a head tube of the main frame F. A front wheel FW is rotatably mounted to a lower end of the front suspension FS. The swing arm SA is pivotally coupled to a rear section of the main frame F. A rear suspension RS is mounted is provided between the main frame F and the swing arm SA. A rear wheel RW is rotatably mounted to a rear end of the swing arm SA. The front wheel FW includes a front rim FR and a front tire FT. The front rim FR is attached to a front hub by a plurality of spokes in a conventional manner. The rear wheel RW includes a rear rim RR and a front tire RT. The rear rim RR is attached to a rear hub by a plurality of spokes in a conventional manner. The human-powered vehicle 1 further includes a bicycle seat S, a handlebar H and a drivetrain DT. The bicycle seat S is mounted on top of a seatpost SP that is mounted to the main frame F in a conventional manner. The handlebar H is attached to the front suspension FS for steering the front wheel FW. The drivetrain DT is a conventional pedal operated drivetrain that transmits a pedaling force to the rear wheel RW via a chain.

As seen in FIG. 2, the human-powered vehicle (e.g., a bicycle) suspension assembly 10 basically comprises the front suspension FS, the rear suspension RS and the suspension control device 12. The human-powered vehicle (e.g., a bicycle) suspension assembly 10 further comprises a power supply B and one or more user operable input devices 14. The power supply B is attached to a down tube of the main frame F. The power supply B provides electrical power to the front suspension FS, the rear suspension RS and the suspension control device 12. The user operable input device(s) 14 can include, for example, a button, a switch, a lever, a dial and/or a touch screen. The user operable input device(s) 14 can be mounted on the handlebar or other suitable portion of the human-powered vehicle 1.

The suspension control device 12 comprises an electronic controller 16. The electronic controller 16 can be programmed to control one of the front and rear suspensions FS and RS, or can be programmed to control both of the front and rear suspensions FS and RS, as explained below. The electronic controller 16 includes one or more processors (hardware) 16a and a memory device 16b (hardware). The processor 16a includes, for example, a central processing unit (CPU) or a micro-processing unit (MPU).

The memory device 16b stores control programs, data, settings, detection results, etc. The memory device 16b is any computer storage device or any computer readable medium with the sole exception of a transitory, propagating signal. The memory device 16b includes a non-volatile memory such as a RAM (Random Access Memory) device, a hard disk, a flash drive, etc. The processor 16a executes the control programs stored in the memory device 16b for controlling one of the front and rear suspensions FS and RS, or both of the front and rear suspensions FS and RS, as explained below.

The electronic controller 16 can further include a communicator 16c. The communicator 16c includes a communication circuit that performs wired and wireless communications. For example, the communicator 16c includes a Power Line Communication (PLC) circuit for communicating using a voltage line the supplies electrical power from the power supply B to the electrical components such as the lock-out motors of the front and rear suspensions FS and RS. Alternatively, dedicated signal lines can be provided to transmit control signals from the communicator 16c of the electronic controller 16 to the front and rear suspensions FS and RS. Also, for example, the communicator 16c includes a wireless receiver having a wireless communication circuit for wirelessly communicating with the various sensors. In other words, in the illustrated embodiment, the communicator 16c is configured to communicate with the front and rear suspensions FS and RS through wired connections, and is configured to communicate with the sensors using wireless communication. The wireless communication standard used by the suspension control device 12 can be, for example, ANT+® or Bluetooth®.

In the illustrated embodiment, the processor(s) 16a, the memory device(s) 16b and the communicator 16c are circuit on one or more semiconductor chips. The semiconductor chips are mounted on a printed circuit board that is included in the electronic controller 16. In the illustrated embodiment, the electronic controller 16 is a semiconductor chip, and the processor(s) 16a, the memory device(s) 16b and the communicator 16c are modules included in the semiconductor chip. The processor(s) 16a, the memory device(s) 16b and the communicator 16c are electrically connected via a bus. A user can access the electronic controller 16 using an external input device to transmit signals to the electronic controller 16 for updating and deleting information stored in the memory device(s) 16b and for adding information to the memory device(s) 16b. The electronic controller 16 performs a process of a computer program stored in the memory device(s) 16b in accordance with a signal received from the external input device. For example, the external input devices can be a laptop, a smartphone, a tablet terminal, and/or a cycle computer. Thus, the electronic controller 16 and the input devices can communicate either through wires or wirelessly.

The suspension control device 12 further comprises at least one sensor that is configured to detect a parameter of the human-powered vehicle 1 for controlling a suspension. The suspension includes the front suspension FS. The suspension includes the rear suspension RS. In other words, the suspension control locked state device 12 can control one of the front and rear suspensions FS and RS, or both of the front and rear suspensions FS and RS. Thus, the suspension control device 12 basically comprises a sensor and an electronic controller. Thus, generally speaking, the electronic controller 16 is configured to selectively control a suspension (e.g., one or both of the front and rear suspensions FS and RS) of the human-powered vehicle 1 in accordance with the information detected by the sensor. The sensor is configured to detect information relating to at least one of a road surface condition and a ground contact condition. More preferably, the sensor is configured to detect information relating to a ground contact condition. Here, in the illustrated embodiment, the suspension control device 12 preferably includes a plurality of sensors to control both of the front and rear suspensions FS and RS, as explained below.

The electronic controller 16 is configured to selectively control a lockout state of the suspension (e.g., one or both of the front and rear suspensions FS and RS) in accordance with the information. The lockout state includes a lockout ON state and a lockout OFF state. Preferably, the front and rear suspensions FS and RS are configured such that they can assume one of two operating states: a locked or lockout ON state (no damping), and a free or lockout OFF state with damping. The term "lockout ON state" as used herein refers to a suspension operating state in which the suspension is prohibited from expanding and contracting. However, the lockout ON state can include a state in which the wheel FW or RW can move slightly relative to the main frame F by a strong force applied to the wheel FW or RW. The lockout ON state is also called a "lockout-released state." The term "lockout OFF state" as used herein refers to a suspension operating state in which the suspension can expand and contract freely as a force is applied to the wheel FW or RW. The front suspension FS and the rear suspension RS are configured such that the operating states thereof can be set using reversible electric motors (lockout motors in FIG. 2). Each of the front suspension FS and the rear suspension RS includes a suspension adjustment mechanism such as an oil chamber, an air chamber and a valve structure to control an oil passageway, or other suitable actuator. The operating state of the front suspension FS or the rear suspension RS can be changed by operating the actuator of the front suspension FS or the rear suspension RS to control a valve provided inside the front suspension FS or the rear suspension RS.

In the illustrated embodiment, the suspension control device 12 includes a front multi-axis acceleration sensor 20. The front multi-axis acceleration sensor 20 can be used to detect both a road surface condition and a ground contact condition of the human-powered vehicle 1 based on the vertical acceleration of the human-powered vehicle 1. In other words, the road surface condition relates to a vertical acceleration of the human-powered vehicle 1. Similarly, the ground contact condition relates to a vertical acceleration of the front wheel FW of the human-powered vehicle 1.

The front multi-axis acceleration sensor 20 includes a wireless transmitter for wirelessly communicating detection results (information relating to a ground contact condition) to the communicator 16c. The wireless transmitter of the front multi-axis acceleration sensor 20 can send the detection results by using, for example, ANT+® or Bluetooth®.

The front multi-axis acceleration sensor 20 is mounted to a front portion of the human-powered vehicle 1. For example, in the illustrated embodiment, the front multi-axis acceleration sensor 20 is mounted to a forward end of a down tube of the human-powered vehicle 1. Preferably, the front multi-axis acceleration sensor 20 is mounted in the vicinity of a front end of the main frame F. In any case, the front multi-axis acceleration sensor 20 is in a front half of the human-powered vehicle 1, and more preferably, in a front third of the human-powered vehicle 1. In this way, the front multi-axis acceleration sensor 20 can detect vertical and forward movement of the front portion of the human-powered vehicle 1 with respect to the ground. However, mounting position of the front multi-axis acceleration sensor 20 is not limited to this embodiment, and can be change accordingly if needed and/or desired. The front multi-axis acceleration sensor 20 is configured to detect information relating to a ground contact condition. In other words, the ground contact condition relates to a vertical acceleration of the front wheel FW of the human-powered vehicle 1. Also, the front multi-axis acceleration sensor 20 is configured to detect information relating to a road surface condition. The road surface condition relates to a forward velocity of the human-powered vehicle 1.

The front multi-axis acceleration sensor 20 can be a two-axis accelerometer or a three-axis accelerometer that is configured to detect an acceleration of the human-powered vehicle 1 in a vertical direction, and a forward velocity of the human-powered vehicle 1 in a forward or propulsion direction of the human-powered vehicle 1. Alternative, the front multi-axis acceleration sensor 20 can include two or more individual sensors that detect different parameters of the movement of the human-powered vehicle 1. For example, the front multi-axis acceleration sensor 20 can include a vertical acceleration sensor that is configured to detect an acceleration of the human-powered vehicle 1 in the vertical direction, and a forward velocity sensor (e.g., ground speed radar) that is configured to detect a forward velocity of the human-powered vehicle 1 in the forward or propulsion direction of the human-powered vehicle 1.

In the illustrated embodiment, the suspension control device 12 further includes a rear multi-axis acceleration sensor 22. The rear multi-axis acceleration sensor 22 can be used to detect both a road surface condition and a ground contact condition of the human-powered vehicle 1 based on the vertical acceleration of the human-powered vehicle 1. In other words, the road surface condition relates to a vertical acceleration of the human-powered vehicle 1. Similarly, the ground contact condition relates to a vertical acceleration of the rear wheel RW of the human-powered vehicle 1.

The rear multi-axis acceleration sensor 22 includes a wireless transmitter for wirelessly communicating detection results (information relating to a ground contact condition) to the communicator 16c. The wireless transmitter of the rear multi-axis acceleration sensor 22 can send the detection results by using, for example, ANT+® or Bluetooth®.

In the illustrated embodiment, the rear multi-axis acceleration sensor 22 is mounted to the swing arm SA of the human-powered vehicle 1. In any case, the rear multi-axis acceleration sensor 22 is in a rear half of the human-powered vehicle 1, and more preferably, in a rear third of the human-powered vehicle 1. In this way, the rear multi-axis acceleration sensor 22 can detect vertical and forward movement of the rear portion of the human-powered vehicle 1 with respect to the ground. However, mounting position of the rear multi-axis acceleration sensor 22 is not limited to this embodiment, and can be change accordingly if needed and/or desired. The rear multi-axis acceleration sensor 22 is configured to detect information relating to a ground contact condition. In other words, the ground contact condition relates to a vertical acceleration of the rear wheel RW of the human-powered vehicle 1.

The rear multi-axis acceleration sensor 22 can be a two-axis accelerometer or a three-axis accelerometer that is configured to detect an acceleration of the human-powered vehicle 1 in a vertical direction, and a forward velocity of the human-powered vehicle 1 in the forward or propulsion direction of the human-powered vehicle 1. Alternative, the rear multi-axis acceleration sensor 22 can include two or more individual sensors that detect different parameters of the movement of the human-powered vehicle 1. For example, the rear multi-axis acceleration sensor 22 can include a vertical acceleration sensor that is configured to detect an acceleration of the human-powered vehicle 1 in the vertical direction, and a forward velocity sensor (e.g., ground speed radar) that is configured to detect a forward velocity of the human-powered vehicle 1 in the forward or propulsion direction of the human-powered vehicle 1.

In the illustrated embodiment, the suspension control device 12 includes a front tire load sensor 26 that is mounted to an air valve of the front wheel FW of the human-powered vehicle 1. In other words, the front tire load sensor 26 is a sensor that is configured to detect an air compression of the front tire FT attached to the front wheel FW as the load of the front wheel FW. In this way, the front tire load sensor 26 is configured to detect information relating to a road surface condition that the human-powered vehicle 1 is traveling on. Also, using the front tire load sensor 26, a ground contact condition of the front wheel FW can be detected. In other words, the ground contact condition relates to a load of a front wheel FW of the human-powered vehicle 1.

For example, in the illustrated embodiment, the front tire load sensor 26 can be an air pressure sensor that measures pressure changes in the front tire FT. For example, the front tire load sensor 26 can be a wireless power meter or a tire air pressure monitor. The front tire load sensor 26 includes a wireless transmitter for wirelessly communicating detection results (information relating to a ground contact condition or road surface condition) to the communicator 16c. The wireless transmitter of the front tire load sensor 26 can send the detection results by using, for example, ANT+® or Bluetooth®. Alternatively, the front tire load sensor 26 can be one or more strain gauges attached to the front tire FT for measuring stresses in the front tire FT. Thus, strain gauges attached to the front tire FT can be used to detect the load of the front wheel FW of the human-powered vehicle 1.

In the illustrated embodiment, the suspension control device 12 includes a rear tire load sensor 28 that is mounted to an air valve of the rear wheel RW of the human-powered vehicle 1. In other words, the rear tire load sensor 28 is a sensor that is configured to detect an air compression of the rear tire FT attached to the rear wheel RW as the load of the rear wheel RW. In this way, the rear tire load sensor 28 is configured to detect information relating to a road surface condition that the human-powered vehicle 1 is traveling on. Also, using the rear tire load sensor 28, a ground contact condition of the rear wheel RW can be detected. In other words, the ground contact condition relates to a load of a rear wheel RW of the human-powered vehicle 1. For example, in the illustrated embodiment, the rear tire load sensor 28 can be an air pressure sensor that measures pressure changes in the rear tire RT.

For example, the rear tire load sensor 28 can be a wireless power meter or a tire air pressure monitor. The rear tire load sensor 28 includes a wireless transmitter for wirelessly communicating detection results (information relating to a ground contact condition or road surface condition) to the communicator 16c. The wireless transmitter of the rear tire load sensor 28 can send the detection results by using, for example, ANT+® or Bluetooth®. Alternatively, the rear tire load sensor 28 can be one or more strain gauges attached to the rear tire RT for measuring stresses in the rear tire RT. Thus, strain gauges attached to the front tire FT can be used to detect the load of the rear wheel RW of the human-powered vehicle 1.

In the illustrated embodiment, the suspension control device 12 includes a front suspension load sensor 30 that is mounted to the front suspension FS of the human-powered vehicle 1. In other words, the front suspension load sensor 30 is a sensor that is configured to detects a load of the front suspension FS as the load of the front wheel FW. Depending on the configuration of the front suspension FS, the front suspension load sensor 30 detects changes in a fluid pressure of a fluid (air, oil, etc.) or a stress in one or more strain gauges to detect a load applied to the front suspension FS via the front wheel FW. In this way, the front suspension load sensor 30 is configured to detect information relating to a road surface condition that the human-powered vehicle 1 is traveling on. Also, using the front suspension load sensor 30, a ground contact condition of the front wheel FW can be detected. In other words, the ground contact condition relates to a load of the front wheel FW of the human-powered vehicle 1.

For example, in the illustrated embodiment, the front suspension load sensor 30 can be a fluid pressure sensor that measures pressure changes in a fluid chamber. The front suspension load sensor 30 includes a wireless transmitter for wirelessly communicating detection results (information relating to a ground contact condition or road surface condition) to the communicator 16c. The wireless transmitter of the front suspension load sensor 30 can send the detection results by using, for example, ANT+® or Bluetooth®. Alternatively, the front suspension load sensor 30 can be one or more strain gauges attached to the front suspension FS for measuring stresses in the front suspension FS. Thus, strain gauges attached to the front suspension FS can be used to detect the load of the front wheel FW of the human-powered vehicle 1.

In the illustrated embodiment, the suspension control device 12 includes a rear suspension load sensor 32 that is mounted to the rear suspension RS of the human-powered vehicle 1. In other words, the rear suspension load sensor 32 is a sensor is configured to detect a load of the rear suspension RS as the load of the rear wheel RW. Depending on the configuration of the rear suspension RS, the rear suspension load sensor 32 detects changes in a fluid pressure of a fluid (air, oil, etc.) or a stress in one or more strain gauges to detect a load applied to the rear suspension RS via the rear wheel RW. In this way, the rear suspension load sensor 32 is configured to detect information relating to a road surface condition that the human-powered vehicle 1 is traveling on. Also, using the rear suspension load sensor 32, a ground contact condition of the front wheel FW can be detected. In other words, the ground contact condition relates to a load of the front wheel FW of the human-powered vehicle 1.

For example, in the illustrated embodiment, the rear suspension load sensor 32 can be a fluid pressure sensor that measures pressure changes in a fluid chamber. The rear suspension load sensor 32 includes a wireless transmitter for wirelessly communicating detection results (information relating to a ground contact condition or road surface condition) to the communicator 16c. The wireless transmitter of the rear suspension load sensor 32 can send the detection results by using, for example, ANT+® or Bluetooth®. Alternatively, the rear suspension load sensor 32 can be one or more strain gauges attached to the rear suspension RS for measuring stresses in the front suspension FS. Thus, strain gauges attached to the rear suspension RS can be used to detect the load of the rear wheel RW of the human-powered vehicle 1.

Referring now to FIG. 3, a control table is illustrated that correlates the control of an operating state of one or both the front and rear suspensions FS and RS in accordance with a traveling state of the human-powered vehicle 1 as determined by the detections results of the front and rear multi-axis acceleration sensors 20 and 22. The relationships of the control table of FIG. 3 are prestored in the memory device 16c of the electronic controller 16.

As seen in FIG. 3, when the traveling state of the human-powered vehicle 1 is determined to be traveling off-road, the electronic controller 16 sets the operating states of both the front and rear suspensions FS and RS to the lockout OFF state. The electronic controller 16 determines the traveling state to be a traveling off-road state when the front and rear vertical accelerations (detection results) detected by the front and rear multi-axis acceleration sensors 20 and 22 are fluctuating above a predetermined threshold value (e.g., gravity: 9.81 m/s$^2$) within a predetermined period (e.g., one to two seconds). The predetermined threshold value and the predetermined period are set and stored in the memory device 16b.

However, if the front and rear vertical accelerations (detection results) of the front and rear multi-axis acceleration sensors 20 and 22 remain substantially equal to the predetermined threshold value (e.g., gravity: 9.81 m/s$^2$), then the electronic controller 16 determines the traveling state to be a traveling on-road state. In the traveling on-road state, the electronic controller 16 sets the operating states of both the front and rear suspensions FS and RS to the lockout ON state.

As seen in FIG. 3, when the traveling state of the human-powered vehicle 1 is determined to be in a jumping state, the electronic controller 16 sets the operating states of both the front and rear suspensions FS and RS to the lockout OFF state. The electronic controller 16 determines the traveling state to be a jumping state when both of the front and rear vertical accelerations (detection results) detected by the front and rear multi-axis acceleration sensors 20 and 22 decrease below a predetermined threshold value (e.g., gravity: 9.81 m/s$^2$).

As seen in FIG. 3, when the traveling state of the human-powered vehicle 1 is determined to be in a wheelie state, the electronic controller 16 sets the operating state of the front suspension FS to the lockout OFF state and sets the rear suspension RS to the lockout ON state. In the wheelie state, the front wheel FW is in a floating condition and the rear wheel RW is in a ground or road contact condition. The electronic controller 16 determines the traveling state to be a wheelie state when the front vertical acceleration (detection result) detected by the front multi-axis acceleration sensor 20 decreases below a predetermined threshold value (e.g., gravity: 9.81 m/s$^2$) and the rear forward velocity (detection result) detected by the rear multi-axis acceleration sensor 22 becomes not more than a predetermined threshold value.

As seen in FIG. 3, when the traveling state of the human-powered vehicle 1 is determined to be in a jack knife state, the electronic controller 16 sets the rear suspension RS to the lockout OFF state and sets the operating state of the front suspension FS to the lockout ON state. In the jack knife state, the rear wheel RW is in a floating condition and the front wheel FW is in a ground or road contact condition. The electronic controller 16 determines the traveling state to be a jack knife state when the rear vertical acceleration (detection result) detected by the rear multi-axis acceleration sensor 22 decreases below a predetermined threshold value (e.g., gravity: 9.81 m/s$^2$) and the front forward velocity (detection result) detected by the front multi-axis acceleration sensor 20 becomes not more than a predetermined threshold value.

Referring now to FIGS. 4 and 5, determination tables are illustrated that correlates detection results detected by the front and rear multi-axis acceleration sensors 20 and 22 to determine the traveling state of the human-powered vehicle 1. The determination table of FIG. 4, correlates vertical acceleration detection results detected by the front and rear multi-axis acceleration sensors 20 and 22 to determine the traveling state of the human-powered vehicle 1. On the other hand, the determination table of FIG. 5, correlates forward velocity detection results detected by the front and rear multi-axis acceleration sensors 20 and 22 to determine the traveling state of the human-powered vehicle 1. During normal travelling on a paved road, the human-powered vehicle 1 is in an on-road state in which the front and rear suspensions FS and RS are in a lockout ON state. The term "on-road" refers to a road surface with a small change in the running load (change in a tangential force between the tire and the road surface) of the human-powered vehicle 1 such as a paved road. On the other hand, the term "off-road" refers to a road surface with a large change in the running load of the human-powered vehicle 1 such as a rocky surface or a dirt surface.

In the on-road state, the front and rear multi-axis acceleration sensors 20 and 22 will detect gravity acting on the human-powered vehicle 1. Thus, in the on-road state, the front and rear vertical accelerations (detection results) detected by the front and rear multi-axis acceleration sensors 20 and 22 are equal to the force of gravity: 9.81 m/s$^2$. If the front wheel FW hits a bump in the road, the front vertical acceleration (detection result) detected by the front multi-axis acceleration sensor 20 becomes less than the force of gravity: 9.81 m/s$^2$ as the human-powered vehicle 1 moves in an upward or vertical direction. Likewise, if the rear wheel RW hits a bump in the road, the rear vertical acceleration (detection result) detected by the rear multi-axis acceleration sensor 22 becomes less than the force of gravity: 9.81 m/s$^2$ as the human-powered vehicle 1 moves in an upward or vertical direction.

As seen in FIG. 4, an off-road state is determined to occur when the front and rear vertical accelerations (detection results) detected by the front and rear multi-axis acceleration sensors 20 and 22 are above the predetermined threshold values (e.g., gravity: 9.81 m/s$^2$). To avoid releasing the lockout state of the front and rear suspensions FS and RS too quickly (e.g., due to a single bump or recess in the road), the electronic controller 16 further determines that the front and rear vertical accelerations exceed the predetermined threshold values several times within a predetermined period of time (e.g. one or two seconds). Thus, if the front and rear vertical accelerations exceed the predetermined threshold values several times within the predetermined period of time, then electronic controller 16 determines the traveling state of the human-powered vehicle 1 to be in an off-road state and both of the front and rear suspensions FS and RS should be set to the lockout OFF state.

As seen in FIGS. 4 and 5, a jack knife state is based on both the vertical acceleration and the forward velocity of the human-powered vehicle 1. First, for a jack knife state to be determined to be occurring, the rear vertical acceleration is detected by the rear multi-axis acceleration sensor 22 to be below the predetermined threshold value, and the front vertical acceleration is detected by the front multi-axis acceleration sensor 20 to not be below the predetermined threshold value. Second, for a jack knife state to be determined to be occurring, the front forward velocity is detected by the front multi-axis acceleration sensor 20 to be below the predetermined threshold value, and the rear forward velocity is detected by the rear multi-axis acceleration sensor 22 to be below the predetermined threshold value.

As seen in FIGS. 4 and 5, a wheelie state is determined based on both the vertical acceleration and the forward velocity of the human-powered vehicle 1. First, for a wheelie state to be determined to be occurring, the front vertical acceleration is detected by the front multi-axis acceleration sensor 20 to be below the predetermined threshold value, and the front vertical acceleration is detected by the front multi-axis acceleration sensor 20 to not be below the predetermined threshold value. Second, for a wheelie state to be determined to be occurring, the rear forward velocity is detected by the front multi-axis acceleration sensor 22 to be below the predetermined threshold value, and the front forward velocity is detected by the front multi-axis acceleration sensor 20 not to be below the predetermined threshold value.

Figure 6:
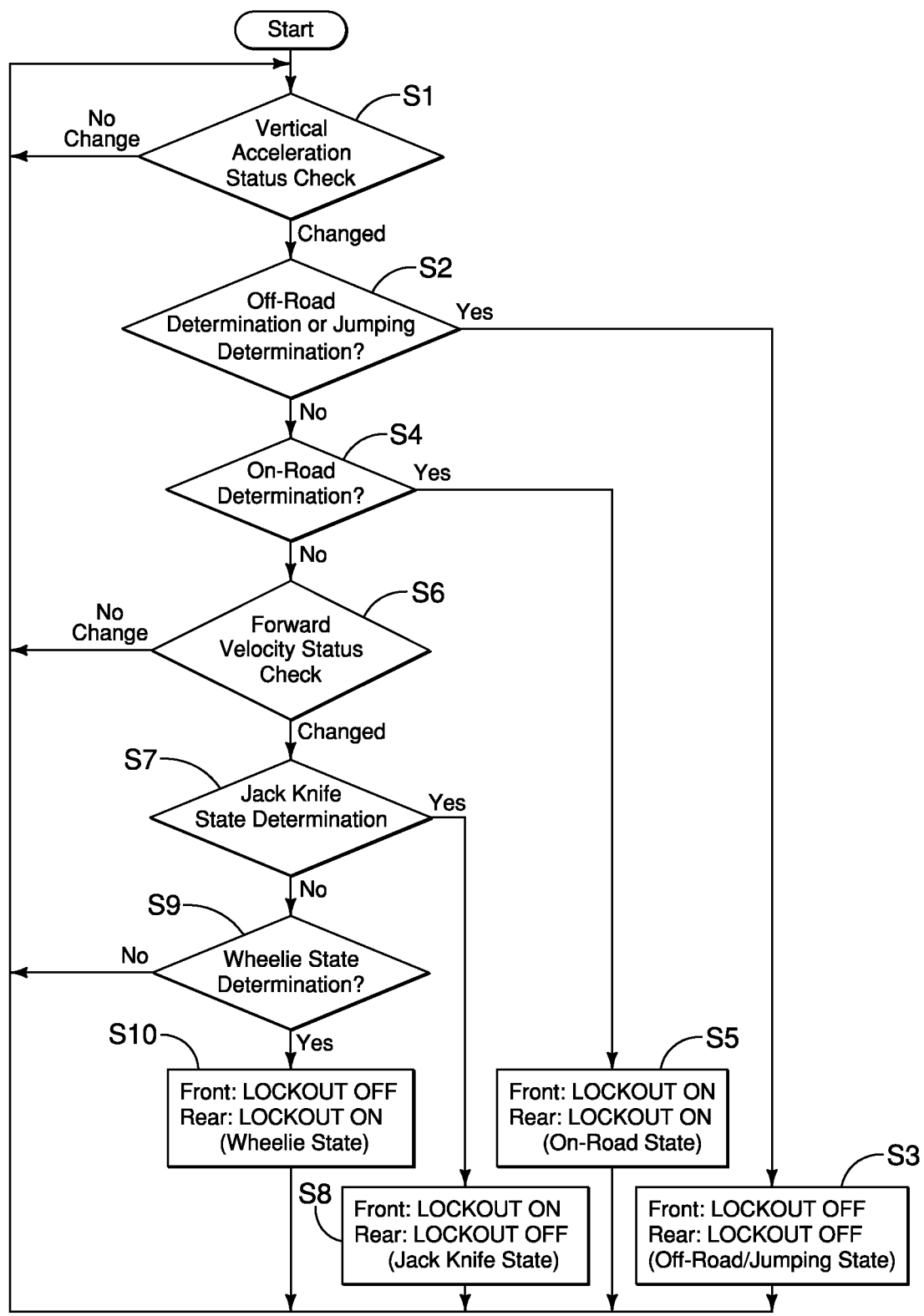
FIG. 6 is a flowchart of an automatic suspension control executed by the electronic controller of the suspension control device for automatically changing a lockout state (e.g., a lockout ON state or a lockout OFF state) of the front and rear suspensions in accordance with information (detection results) of front and rear multi-axis acceleration sensors that are configured to detect information relating to a ground contact condition of the human-powered vehicle.

Now, referring to FIG. 6, a flowchart illustrates an automatic suspension control that is executed by the electronic controller 16 of the suspension control device 12 for automatically changing a lockout state (e.g., a lockout ON state or a lockout OFF state) of the front and rear suspensions FS and RS in accordance with information (detection results) of the front and rear multi-axis acceleration sensors 20 and 22. In other words, in executing the control process of FIG. 6, the electronic controller 16 is configured to selectively control a suspension (e.g., one or both of the front and rear suspensions FS and RS) of the human-powered vehicle 1 in accordance with the information detected by a sensor (e.g., the front and rear multi-axis acceleration sensors 20 and 22).

Here, the electronic controller 16 does not actually determine the specific riding style of the human-powered vehicle 1, but rather detects traveling conditions detected by the front and rear multi-axis acceleration sensors 20 and 22, and then adjusts the front and rear suspensions FS and RS to provide a more comfortable ride. The riding conditions (e.g., off-road state, on-road state, jumping state, jack knife state and wheelie state) mentioned herein are merely provided as an image to give a better understanding of a possible detected position or orientation of the human-powered vehicle 1.

In step S1, the electronic controller 16 receives detection results that are periodically sent from the front and rear multi-axis acceleration sensors 20 and 22, and then makes a determination of whether or not a change is the traveling state of the human-powered vehicle 1 based on the detection results from the front and rear multi-axis acceleration sensors 20 and 22. In step S1, the electronic controller 16 compares the detection results from the multi-axis acceleration sensors 20 and 22 with the correlations between the traveling state and the vertical acceleration of the human-powered vehicle 1 as set forth in FIG. 4. If the detection results from the front and rear multi-axis acceleration sensors 20 and 22 indicate no change in the traveling state having occurred based on the correlation table of FIG. 4, then step S1 is repeated until the detection results from the front and rear multi-axis acceleration sensors 20 and 22 indicate a change in the traveling state has occurred based on the correlation table of FIG. 4. Upon determining a change in the traveling state has occurred in step S1, then the control process proceeds to step S2.

In step S2, the electronic controller 16 uses the correlation table of FIG. 4 to determine if an off-road state or a jumping state is occurring. As indicated in the tables of FIGS. 3 and 4, for an off-road state or a jumping state, the road surface condition relates to a vertical acceleration of the human-powered vehicle 1. As indicated in the table of FIG. 3, the electronic controller 16 is configured to set the lockout state with the lockout OFF state in accordance with a comparison between the vertical acceleration and a predetermined threshold value. If the electronic controller 16 determines either an off-road state or a jumping state is occurring, then the control process proceeds to step S3. If the electronic controller 16 determines neither an off-road state nor a jumping state is occurring, then the control process proceeds to step S4.

In step S3, the electronic controller 16 output suspension control signals to control the suspension states of both of the front and rear suspensions FS and RS to the lockout OFF states. Of course, if one or both of the front and rear suspensions FS and RS are already in the lockout OFF state, then the front and rear suspensions FS and RS that is already in the lockout OFF state is not changed. Thus, in step S3, the electronic controller 16 is configured to selectively set a lockout state of a suspension (e.g., the front and rear suspensions FS and RS) of the human-powered vehicle 1 with a lockout OFF state in accordance with the information detected by the sensor (e.g., the multi-axis acceleration sensors 20 and 22). In other words, the electronic controller 16 is configured to selectively set the lockout state with the lockout OFF state in accordance with the information.

In step S4, the electronic controller 16 uses the correlation table of FIG. 4 to determine if an on-road state is occurring. As indicated in the tables of FIGS. 3 and 4, for an on-road state, the road surface condition relates to a vertical acceleration of the human-powered vehicle 1. As indicated in the table of FIG. 3, the electronic controller 16 is configured to set the lockout state with the lockout OFF state in accordance with a comparison between the vertical acceleration and a predetermined threshold value (e.g., the force of gravity). If the electronic controller 16 determines either an on-road state is occurring, then the control process proceeds to step S5. If the electronic controller 16 determines an on-road state is not occurring, then the control process proceeds to step S6.

In step S5, the electronic controller 16 output suspension control signals to control the suspension states of both of the front and rear suspensions FS and RS to the lockout ON states. Of course, if one or both of the front and rear suspensions FS and RS are already in the lockout ON state, then the front and rear suspensions FS and RS that is already in the lockout ON state is not changed.

In step S6, the electronic controller 16 compares the detection results from the multi-axis acceleration sensors 20 and 22 with the correlations between the traveling state and the forward velocity of the human-powered vehicle 1 as set forth in FIG. 5. As indicated in the tables of FIGS. 3 and 5, for a jack knife state or a wheelie state, the road surface condition relates to a forward velocity of the human-powered vehicle 1. The electronic controller 16 is configured to set the lockout state with the lockout OFF state in accordance with a comparison between the forward velocity and a predetermined threshold value.

If the detection results from the front and rear multi-axis acceleration sensors 20 and 22 indicate no change in the traveling state having occurred based on the correlation table of FIG. 5, then the control process returns to step S1. If the electronic controller 16 determines a change in the traveling state has occurred in Step S6, then the control process proceeds to step S7.

In step S7, the electronic controller 16 uses the correlation tables of FIGS. 4 and 5 to determine if a jack knife state is occurring. If the electronic controller 16 determines either a jack knife state is occurring, then the control process proceeds to step S8. If the electronic controller 16 determines a jack knife state is not occurring, then the control process proceeds to step S9.

In step S8, the electronic controller 16 output suspension control signals to control the suspension states of the front suspension FS to the lockout ON state and the rear suspension RS to the lockout OFF state. Of course, if the front suspension FS is already in the lockout ON state, then the front suspension FS is not changed. Likewise, if the rear suspension RS is already in the lockout OFF state, then the rear suspension RS is not changed. Thus, in step S8, the electronic controller 16 is configured to selectively set a lockout state of a suspension (e.g., the rear suspension RS) of the human-powered vehicle 1 with a lockout OFF state in accordance with the information detected by the sensor (e.g., the multi-axis acceleration sensors 20 and 22). In other words, the electronic controller 16 is configured to selectively set the lockout state with the lockout OFF state in accordance with the information.

In step S9, the electronic controller 16 uses the correlation tables of FIGS. 4 and 5 to determine if a wheelie state is occurring. If the electronic controller 16 determines either a wheelie state is occurring, then the control process proceeds to step S10. If the electronic controller 16 determines a wheelie state is not occurring, then the control process proceeds back to step S1.

In step S10, the electronic controller 16 output suspension control signals to control the suspension states of the front suspension FS to the lockout OFF state and the rear suspension RS to the lockout ON state. Of course, if the front suspension FS is already in the lockout OFF state, then the front suspension FS is not changed. Likewise, if the rear suspension RS is already in the lockout ON state, then the rear suspension RS is not changed. Thus, in step S10, the electronic controller 16 is configured to selectively set a lockout state of a suspension (e.g., the front suspension FS) of the human-powered vehicle 1 with a lockout OFF state in accordance with the information detected by the sensor (e.g., the multi-axis acceleration sensors 20 and 22). In other words, the electronic controller 16 is configured to selectively set the lockout state with the lockout OFF state in accordance with the information.

Referring now to FIG. 7, a control table is illustrated that correlates the control of an operating state of one or both the front and rear suspensions FS and RS in accordance with a traveling state of the human-powered vehicle 1 as determined by the detections results of the front and rear tire load sensors 26 and 28. The relationships of the control table of FIG. 7 are prestored in the memory device 16c of the electronic controller 16.

As seen in FIG. 7, when the traveling state of the human-powered vehicle 1 is determined to be traveling off-road, the electronic controller 16 sets the operating states of both the front and rear suspensions FS and RS to the lockout OFF state. The electronic controller 16 determines the traveling state to be a traveling off-road state when the front and rear tire loads (detection results) detected by the front and rear tire load sensors 26 and 28 are fluctuating above a predetermined threshold value (e.g., normal ground contact pressure value) within a predetermined period (e.g., one to two seconds). The normal ground contact pressure value depends on the particular configuration of the human-powered vehicle 1. Thus, for example, normal ground contact pressure value for a mountain bike could be between twenty-five psi to forty psi. In any case, the predetermined threshold value and the predetermined period are set and stored in the memory device 16b.

However, if the front and rear tire loads (detection results) of the front and rear tire load sensors 26 and 28 remain substantially equal to the predetermined threshold value (e.g., normal ground contact pressure value), then the electronic controller 16 determines the traveling state to be a traveling on-road state. In the traveling on-road state, the electronic controller 16 sets the operating states of both the front and rear suspensions FS and RS to the lockout ON state.

As seen in FIG. 7, when the traveling state of the human-powered vehicle 1 is determined to be in a jumping state, the electronic controller 16 sets the operating states of both the front and rear suspensions FS and RS to the lockout OFF state. The electronic controller 16 determines the traveling state to be a jumping state when both of the front and rear tire loads (detection results) detected by the front and rear tire load sensors 26 and 28 decrease below a predetermined threshold value (e.g., normal ground contact pressure value). In other words, here, the electronic controller 16 is configured to set the lockout state with the lockout OFF state upon determining the load is equal to or less than a predetermined threshold value (e.g., a value slightly less than a normal ground contact pressure value).

As seen in FIG. 7, when the traveling state of the human-powered vehicle 1 is determined to be in a wheelie state, the electronic controller 16 sets the operating state of the front suspension FS to the lockout OFF state and sets the rear suspension RS to the lockout ON state. The electronic controller 16 determines the traveling state to be a wheelie state when the front tire load (detection result) detected by the front tire load sensor 26 decreases below a predetermined threshold value (e.g., normal ground contact pressure value). In other words, here, the electronic controller 16 is configured to set the lockout state with the lockout OFF state in accordance with a comparison between the vertical acceleration of the front wheel FW and a predetermined threshold value (e.g., a normal ground contact pressure value).

As seen in FIG. 7, when the traveling state of the human-powered vehicle 1 is determined to be in a jack knife state, the electronic controller 16 sets the rear suspension RS to the lockout OFF state and sets the operating state of the front suspension FS to the lockout ON state. The electronic controller 16 determines the traveling state to be a jack knife state when the rear tire load (detection result) detected by the rear tire load sensor 28 decreases below a predetermined threshold value (e.g., normal ground contact pressure value). In other words, here, the electronic controller 16 is configured to set the lockout state with the lockout OFF state in accordance with a comparison between the vertical acceleration of the rear wheel RW and a predetermined threshold value (e.g., a normal ground contact pressure value).

Figure 9:
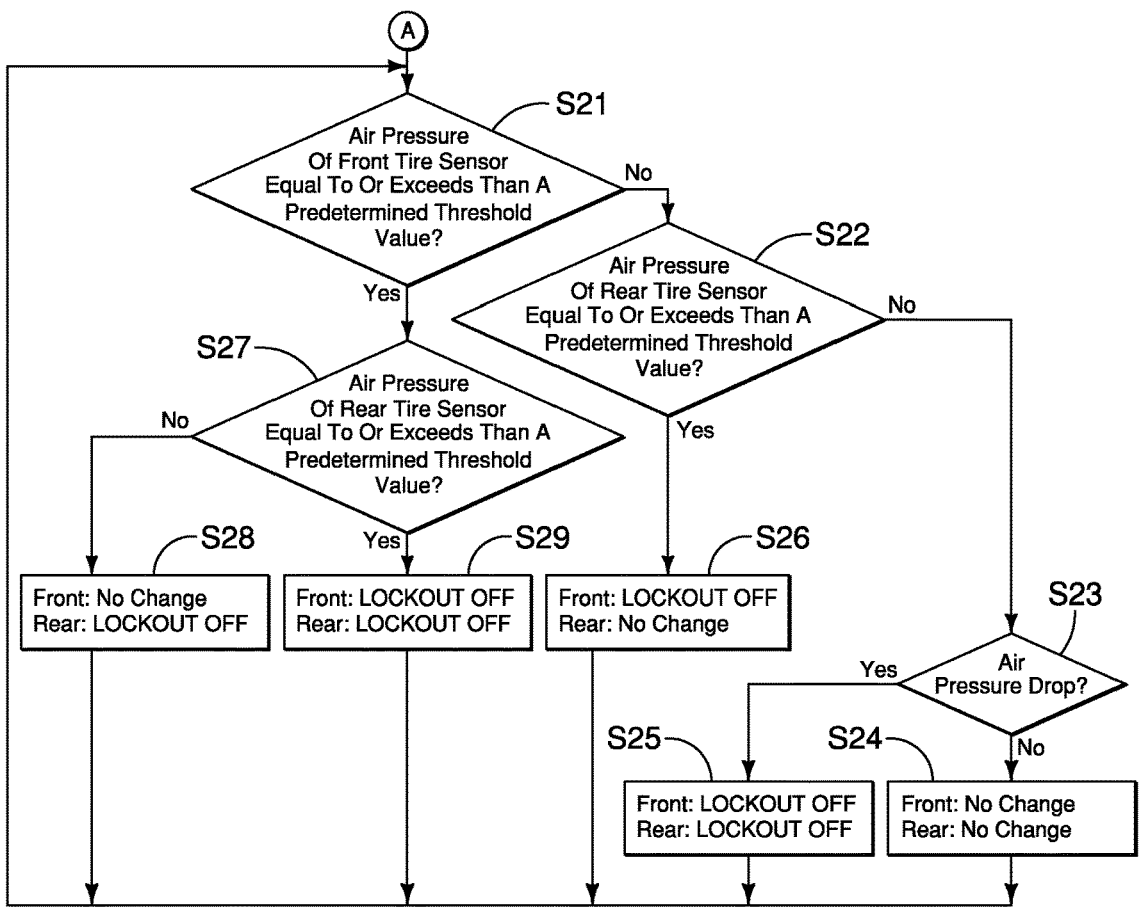
FIG. 9 is a second part of the flowchart of FIG. 8 in which the automatic suspension control executed by the electronic controller of the suspension control device for automatically changing the lockout state of one or both of the front and rear suspensions to the lockout OFF state based on the detection results of the front and rear air pressure sensors.
Figure 10:
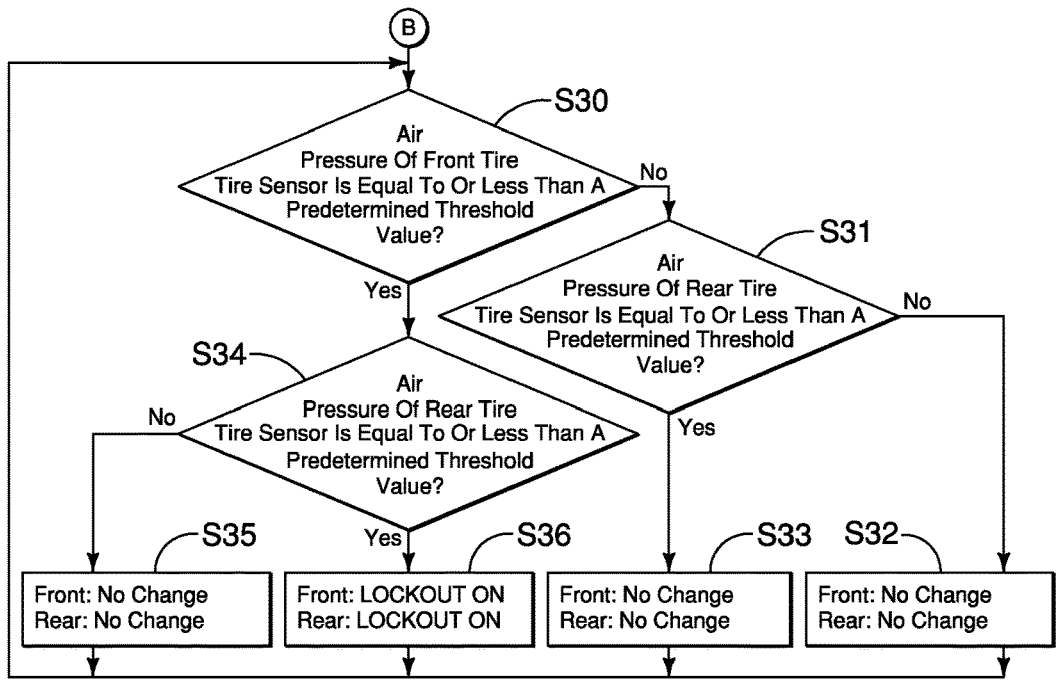
FIG. 10 is a third part of the flowchart of FIG. 8 in which the automatic suspension control executed by the electronic controller of the suspension control device for automatically changing the lockout state of one or both of the front and rear suspensions to the lockout ON state based on the detection results of the front and rear air pressure sensors.

Now, referring to FIGS. 8 to 10, a flowchart (three parts) illustrates an automatic suspension control that is executed by the electronic controller 16 of the suspension control device 12 for automatically changing the lockout state of one or both of the front and rear suspensions FS and RS to either the lockout OFF state or the lockout ON state in accordance with information (detection results) of the front and rear tire load sensors 26 and 28. In other words, in executing the control process of FIGS. 8 to 10, the electronic controller 16 is configured to selectively control a suspension (e.g., one or both of the front and rear suspensions FS and RS) of the human-powered vehicle 1 in accordance with the information detected by a sensor (e.g., the front and rear tire load sensors 26 and 28).

In FIGS. 8 to 10, the tire air pressures of the front and rear tires FT and RT is detected by the front and rear tire load sensors 26 and 28. Thus, the tire air pressure is used to determine the front and rear tire load of the front and rear tires FT and RT. Preferably, the electronic controller 16 receives detection signals from the front and rear tire load sensors 26 and 28 that are indicative of changes in amplitude of the air pressures in the front and rear tires FT and RT. In this way, the changes or variations of the air pressures in the front and rear tires FT and RT are not affected by gravity.

Also in FIGS. 8 to 10, the electronic controller 16 does not actually determine the specific riding style of the human-powered vehicle 1, but rather detects traveling conditions detected by the front and rear tire load sensors 26 and 28, and then adjusts the front and rear suspensions FS and RS to provide a more comfortable ride. The riding conditions (e.g., off-road state, on-road state, jumping state, jack knife state and wheelie state) mentioned herein are merely provided as an image to give a better understanding of a possible detected position or orientation of the human-powered vehicle 1.

In step S20, the electronic controller 16 determines if the front and rear suspensions FS and RS are in the lockout ON states. The electronic controller 16 can determine the lockout states of the front and rear suspensions FS and RS based on a sensor provided on each of the front and rear suspensions FS and RS or can determine the lockout states of the front and rear suspensions FS and RS based on the prior control of the front and rear suspensions FS and RS. If the electronic controller 16 determines the front and rear suspensions FS and RS are in the lockout ON states, then the controller proceeds to step S21 (FIG. 9). On the other hand, if the electronic controller 16 determines the front and rear suspensions FS and RS are in the lockout OFF states, then the controller proceeds to step S30 (FIG. 10).

In step S21, the electronic controller 16 receives detection results that are periodically sent from the front tire load sensor 26, and then determines if the amplitude of the air pressure (front tire load) of the front tire load sensor 26 is equal to or exceeds a predetermined threshold value. The predetermined threshold value in step S21 can be set by the user using the input device(s) 14. The predetermined threshold value in step S21 can have a default value that prestored or initial startup value that is equal to or near a detected ground contact pressure value that at a time that the human-powered vehicle 1 is first starts traveling. If the amplitude of the air pressure (front tire load) of the front tire load sensor 26 is less than the predetermined threshold value in step S21, then the control process proceeds to step S22. In other words, the amplitude of the front tire load being less than the predetermined threshold value in step S21 is indicative of the front wheel FW being in a somewhat floating state that can include a wheelie state, a jumping state, or an on-road state. On the other hand, if the amplitude of the air pressure (front tire load) of the front tire load sensor 26 is equal to or exceeds the predetermined threshold value in step S21, then the control process proceeds to step S27. In other words, the amplitude of the front tire load being equal to or exceeds the predetermined threshold value in step S21 is indicative of the front wheel FW being in a somewhat ground contact state which is indicative of a riding position that can include a jack knife state or an off-road state.

In step S22, the electronic controller 16 receives detection results that are periodically sent from the rear tire load sensor 28, and then determines if the air pressure (rear tire load) of the rear tire load sensor 28 is equal to or exceeds a predetermined threshold value. The predetermined threshold value in step S22 can be set by the user using the input device(s) 14. The predetermined threshold value in step S22 can have a default value that prestored or initial startup value that is equal to or near a detected ground contact pressure value that at a time that the human-powered vehicle 1 is first starts traveling. If the amplitude of the air pressure (rear tire load) of the rear tire load sensor 28 is less than the predetermined threshold value in step S22, then the control process proceeds to step S23. In other words, the amplitude of the rear tire load being less than the predetermined threshold value in step S22 is indicative of the rear wheel RW being in a somewhat floating state that can include a jumping state, or an on-road state. On the other hand, if the amplitude of the air pressure (rear tire load) of the rear tire load sensor 28 is equal to or exceeds the predetermined threshold value in step S22, then the control process proceeds to step S26. In other words, the amplitude of the rear tire load being equal to or exceeds the predetermined threshold value in step S22 is indicative of the rear wheel being is in a somewhat ground contact state that can be a wheelie state.

In step S23, both the front and rear wheels FW and RW are somewhat floating, and the electronic controller 16 uses the front and rear tire load sensors 26 and 28 to determine if an air pressure drop is occurring in both the front and rear tires FT and RT. If the electronic controller 16 determines there is no air pressure drop in both the front and rear tires FT and RT, then the control process proceeds to step S24. Thus, an air pressure drop not occurring in both the front and rear tires FT and RT is indicative of the front and rear wheels FW and RW are somewhat floating but can be considered as stable as in on road. On the other hand, if the electronic controller 16 determines there is an air pressure drop in both the front and rear tires FT and RT, then the control process proceeds to step S25. In other words, an air pressure drop occurring in both the front and rear tires FT and RT is indicative of the front and rear wheels FW and RW are both floating.

In step S24, the electronic controller 16 does not output a suspension lockout OFF signal to either the front and rear suspensions FS and RS because the electronic controller 16 has determined no change in the suspension states of the front and rear suspensions FS and RS is desirable based on the front and rear tire loads.

In step S25, the electronic controller 16 outputs a suspension lockout OFF signal to both the front and rear suspensions FS and RS because the electronic controller 16 has determined that it is desirable to have the suspension states of the front and rear suspensions FS and RS in the lockout OFF state based on the front and rear tire loads.

In step S26, the electronic controller 16 outputs a suspension lockout OFF signal to the front suspension FS but does not output a suspension lockout OFF signal to the rear suspension RS because the electronic controller 16 has determined that it is desirable to have the suspension state of the front suspension FS in the lockout OFF state but not the rear suspension RS based on the front and rear tire loads. Alternatively, the control setting in step S26 can be changed be the user from the current default setting (e.g., the front suspension FS: lockout OFF; and the rear suspension RS: no change) to a user (rider) setting in which the front suspension FS is not changed (i.e., the lockout ON state) and the rear suspension RS is changed to the lockout OFF state. Some riders may prefer the rear suspension RS in lockout OFF state when in the wheelie riding state.

In step S27, the electronic controller 16 receives detection results that are periodically sent from the rear tire load sensor 28, and then determines if the amplitude of the air pressure (rear tire load) of the rear tire load sensor 28 is equal to or exceeds a predetermined threshold value. The predetermined threshold value in step S27 can be set by the user using the input device(s) 14. The predetermined threshold value in step S27 can have a default value that prestored or initial startup value that is equal to or near a detected ground contact pressure value that at a time that the human-powered vehicle 1 is first starts traveling. The predetermined threshold values in steps S22 and S27 can be the same value or different values. If the amplitude of the air pressure (rear tire load) of the rear tire load sensor 28 is less than the predetermined threshold value, then the control process proceeds to step S28. In other words, the amplitude of the rear tire load being less than the predetermined threshold value in step S27 is indicative of the rear wheel RW being in a somewhat floating state that can be a jack knife state. On the other hand, if the amplitude of the air pressure (rear tire load) of the rear tire load sensor 28 is equal to or exceeds the predetermined threshold value in step S22, then the control process proceeds to step S29. In other words, the amplitude of the rear tire load being equal to or exceeds the predetermined threshold value in step S27 is indicative of the rear wheel being is in a somewhat ground contact state that can be an off-road state.

In step S28, the electronic controller 16 does not output a suspension lockout OFF signal to the front suspension FS but outputs a suspension lockout OFF signal to the rear suspension RS because the electronic controller 16 has determined that it is desirable to have the suspension state of the rear suspension RS in the lockout OFF state but not the front suspension FS based on the front and rear tire loads. Alternatively, the control setting in step S28 can be changed be the user from the current default setting (e.g., the front suspension FS: no change; and the rear suspension RS: lockout OFF) to a user (rider) setting in which the front suspension FS is changed to the lockout OFF state and the rear suspension RS is not changed (i.e., the lockout ON state). Some riders may prefer the rear suspension RS in lockout OFF state when in the jack-knife riding state.

In step S29, the electronic controller 16 outputs a suspension lockout OFF signal to the front suspension FS and outputs a suspension lockout OFF signal to the rear suspension RS because the electronic controller 16 has determined that it is desirable to have the suspension states of the front and rear suspensions FS and RS in the lockout OFF state based on the front and rear tire loads.

Now, referring to FIG. 10, a flowchart illustrates an automatic suspension control that is executed by the electronic controller 16 of the suspension control device 12 for automatically changing the lockout OFF state of one or both of the front and rear suspensions FS and RS to the lockout ON state in accordance with information (detection results) of the front and rear tire load sensors 26 and 28. In other words, in executing the control process of FIG. 10, the electronic controller 16 is configured to selectively control a suspension (e.g., one or both of the front and rear suspensions FS and RS) of the human-powered vehicle 1 in accordance with the information detected by a sensor (e.g., the front and rear tire load sensors 26 and 28). In FIG. 10, tire air pressures of the front and rear tires FT and RT is detected by the front and rear tire load sensors 26 and 28. Thus, tire air pressure is used to determine the front and rear tire load of the front and rear tires FT and RT.

In step S30, the electronic controller 16 receives detection results that are periodically sent from the front tire load sensor 26, and then determines if the amplitude of the air pressure (front tire load) of the front tire load sensor 26 is equal to or less than a predetermined threshold value. The predetermined threshold value in step S30 can be set by the user using the input device(s) 14. The predetermined threshold value in step S30 can have a default value that prestored or initial startup value that is equal to or near a detected ground contact pressure value that at a time that the human-powered vehicle 1 is first starts traveling. If the amplitude of the air pressure (front tire load) of the front tire load sensor 26 is greater than the predetermined threshold value, then the control process proceeds to step S31. In other words, the amplitude of the front tire load being greater the predetermined threshold value in step S30 is indicative of the front wheel FW being in a somewhat ground contact state which is indicative of a riding position that can include a jack knife state or an off-road state. If the amplitude of the air pressure (front tire load) of the front tire load sensor 26 is equal to or less than the predetermined threshold value, then the control process proceeds to step S34. In other words, the amplitude of the front tire load being equal to or less than the predetermined threshold value in step S30 is indicative of the front wheel FW being in a somewhat floating state that can include a wheelie state or an on-road state.

In step S31, the electronic controller 16 receives detection results that are periodically sent from the rear tire load sensor 28, and then determines if the amplitude of the air pressure (rear tire load) of the rear tire load sensor 28 is equal to or less than a predetermined threshold value. The predetermined threshold value in step S31 can be set by the user using the input device(s) 14. The predetermined threshold value in step S31 can have a default value that prestored or initial startup value that is equal to or near a detected ground contact pressure value that at a time that the human-powered vehicle 1 is first starts traveling. If the amplitude of the air pressure (rear tire load) of the rear tire load sensor 28 is greater than the predetermined threshold value, then the control process proceeds to step S32. In other words, the amplitude of the rear tire load being greater the predetermined threshold value in step S31 is indicative of the rear wheel being is in a somewhat ground contact state that can be an off-road state. If the amplitude of the air pressure (rear tire load) of the rear tire load sensor 28 is equal to or less than the predetermined threshold value, then the control process proceeds to step S33. In other words, the amplitude of the rear tire load being equal to or less than the predetermined threshold value in step S31 is indicative of the rear wheel RW being in a somewhat floating state that can be a jack knife state.

In step S32, the electronic controller 16 does not output a suspension lockout ON signal to either the front and rear suspensions FS and RS because the electronic controller 16 has determined no change in the suspension states of the front and rear suspensions FS and RS is desirable based on the front and rear tire loads.

In step S33, the electronic controller 16 does not output a suspension lockout ON signal to either the front and rear suspensions FS and RS because the electronic controller 16 has determined no change in the suspension states of the front and rear suspensions FS and RS is desirable based on the front and rear tire loads.

In step S34, the electronic controller 16 receives detection results that are periodically sent from the rear tire load sensor 28, and then determines if the amplitude of the air pressure (rear tire load) of the rear tire load sensor 28 is equal to or less than a predetermined threshold value. The predetermined threshold value in step S34 can be set by the user using the input device(s) 14. The predetermined threshold value in step S34 can have a default value that prestored or initial startup value that is equal to or near a detected ground contact pressure value that at a time that the human-powered vehicle 1 is first starts traveling. The predetermined threshold values in steps S31 and S34 can be the same value or different values. If the amplitude of the air pressure (rear tire load) of the rear tire load sensor 28 is greater than the predetermined threshold value, then the control process proceeds to step S35. In other words, the amplitude of the rear tire load being greater the predetermined threshold value in step S34 is indicative of the rear wheel being is in a somewhat ground contact state that can be a wheelie state. If the amplitude of the air pressure (rear tire load) of the rear tire load sensor 28 is equal to or less than the predetermined threshold value, then the control process proceeds to step S36. In other words, the amplitude of the rear tire load being equal to or less than the predetermined threshold value in step S34 is indicative of the rear wheel RW being in a somewhat floating state that can be an on-road state.

In step S35, the electronic controller 16 does not output a suspension lockout ON signal to either the front and rear suspensions FS and RS because the electronic controller 16 has determined no change in the suspension states of the front and rear suspensions FS and RS is desirable based on the front and rear tire loads.

In step S36, the electronic controller 16 outputs a suspension lockout ON signal to the front suspension FS and outputs a suspension lockout ON signal to the rear suspension RS because the electronic controller 16 has determined that it is desirable to have the suspension states of the front and rear suspensions FS and RS in the lockout ON state based on the front and rear tire loads.

For the flow chart of FIGS. 8 to 10, a subroutine can be provided such that after detecting the "jump state" or "wheelie state" or "jack knife state", the front suspension FS and/or the rear suspension RS can be returned to the original state (i.e. the state occurring immediately prior to the current state) after an excessive impact detected on the floating tire (the acceleration in the vertical direction largely exceeds the reference value).

Referring now to FIG. 11, a control table is illustrated that correlates the control of an operating state of one or both the front and rear suspensions FS and RS in accordance with a traveling state of the human-powered vehicle 1 as determined by the detections results of the front and rear suspension load sensors 26 and 28. The relationships of the control table of FIG. 11 are prestored in the memory device 16c of the electronic controller 16.

As seen in FIG. 11, when the traveling state of the human-powered vehicle 1 is determined to be traveling off-road, the electronic controller 16 sets the operating states of both the front and rear suspensions FS and RS to the lockout OFF state. The electronic controller 16 determines the traveling state to be a traveling off-road state when the front and rear suspension loads (detection results) detected by the front and rear suspension load sensors 26 and 28 are fluctuating above a predetermined threshold value (e.g., no-load condition value) within a predetermined period (e.g., one to two seconds). The no-load condition value depends on the particular configuration of the human-powered vehicle 1. The predetermined threshold value and the predetermined period are set and stored in the memory device 16b.

However, if the front and rear suspension loads (detection results) of the front and rear suspension load sensors 26 and 28 remain substantially equal to the predetermined threshold value (e.g., no-load condition value), then the electronic controller 16 determines the traveling state to be a traveling on-road state. In the traveling on-road state, the electronic controller 16 sets the operating states of both the front and rear suspensions FS and RS to the lockout ON state.

As seen in FIG. 11, when the traveling state of the human-powered vehicle 1 is determined to be in a jumping state, the electronic controller 16 sets the operating states of both the front and rear suspensions FS and RS to the lockout OFF state. The electronic controller 16 determines the traveling state to be a jumping state when both of the front and rear suspension loads (detection results) detected by the front and rear suspension load sensors 26 and 28 decrease below a predetermined threshold value (e.g., no-load condition value). In other words, here, the electronic controller 16 is configured to set the lockout state with the lockout OFF state upon determining the load is equal to or less than a predetermined threshold value (e.g., a value slightly less than a no-load condition value).

As seen in FIG. 11, when the traveling state of the human-powered vehicle 1 is determined to be in a wheelie state, the electronic controller 16 sets the operating state of the front suspension FS to the lockout OFF state and sets the rear suspension RS to the lockout ON state. The electronic controller 16 determines the traveling state to be a wheelie state when the front suspension load (detection result) detected by the front suspension load sensor 26 decreases below a predetermined threshold value (e.g., a no-load condition value). In other words, here, the electronic controller 16 is configured to set the lockout state with the lockout OFF state in accordance with a comparison between the vertical acceleration of the front wheel FW and a predetermined threshold value (e.g., a no-load condition value).

As seen in FIG. 11, when the traveling state of the human-powered vehicle 1 is determined to be in a jack knife state, the electronic controller 16 sets the rear suspension RS to the lockout OFF state and sets the operating state of the front suspension FS to the lockout ON state. The electronic controller 16 determines the traveling state to be a jack knife state when the rear suspension load (detection result) detected by the rear suspension load sensor 28 decreases below a predetermined threshold value (e.g., a no-load condition value). In other words, here, the electronic controller 16 is configured to set the lockout state with the lockout OFF state in accordance with a comparison between the vertical acceleration of the rear wheel RW and a predetermined threshold value (e.g., a no-load condition value).

Figure 13:
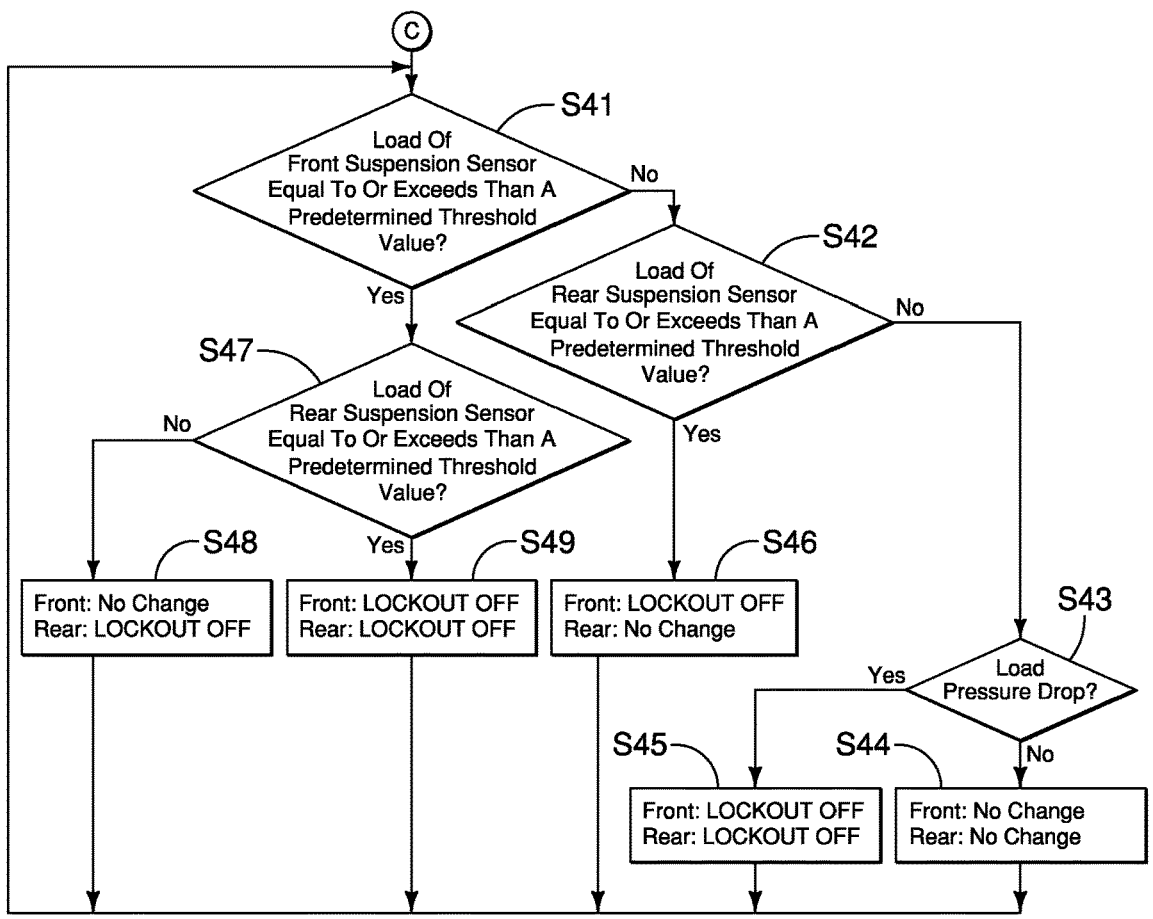
FIG. 13 is a second part of the flowchart of FIG. 12 in which the automatic suspension control executed by the electronic controller of the suspension control device for automatically changing the lockout state of one or both of the front and rear suspensions to the lockout OFF state based on the detection results of the front and rear suspension load sensors.
Figure 14:
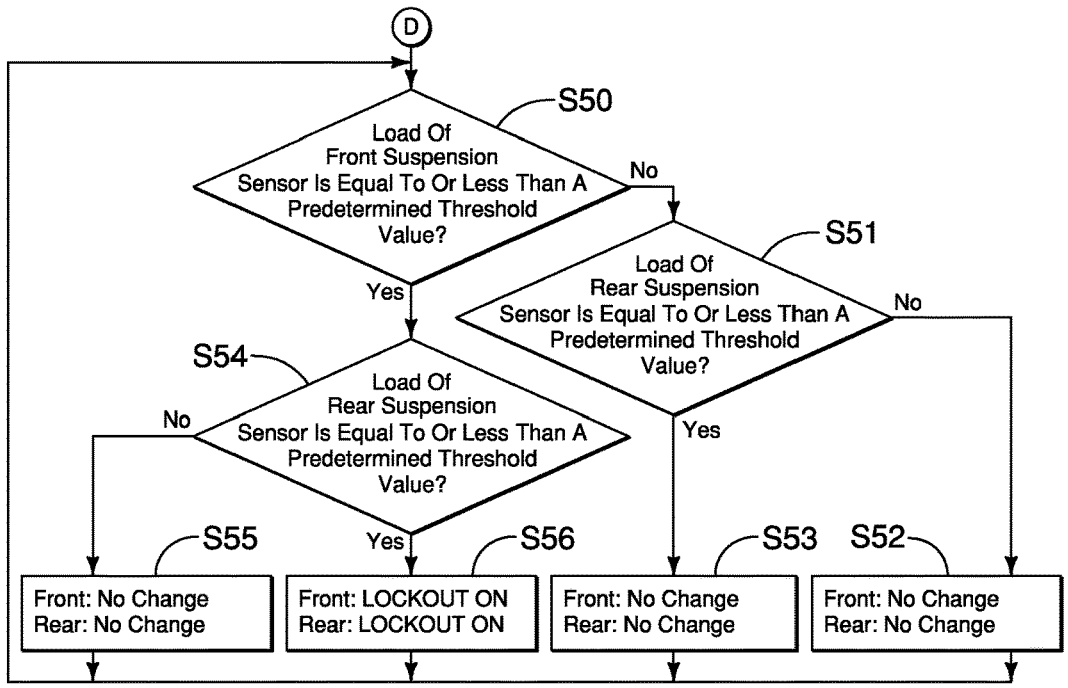
FIG. 14 is a third part of the flowchart of FIG. 12 in which the automatic suspension control executed by the electronic controller of the suspension control device for automatically changing the lockout state of one or both of the front and rear suspensions to the lockout ON state based on the detection results of the front and rear suspension load sensors.

Now, referring to FIGS. 12 to 14, a flowchart (three parts) illustrates an automatic suspension control that is executed by the electronic controller 16 of the suspension control device 12 for automatically changing the lockout state of one or both of the front and rear suspensions FS and RS to either the lockout OFF state or the lockout ON state in accordance with information (detection results) of the front and rear suspension load sensors 30 and 32. In other words, in executing the control process of FIGS. 12 to 14, the electronic controller 16 is configured to selectively control a suspension (e.g., one or both of the front and rear suspensions FS and RS) of the human-powered vehicle 1 in accordance with the information detected by a sensor (e.g., the front and rear suspension load sensors 30 and 32).

In FIGS. 12 to 14, the loads of the front and rear suspensions FS and RS is detected by the front and rear suspension load sensors 30 and 32. Depending on the construction of the front and rear suspension load sensors 30 and 32, the front and rear suspension load sensors 30 and 32 detect either air pressure and/or fluid pressure in the suspension. Thus, the air pressure and/or fluid pressure of the front and rear suspensions FS and RS is used to determine the front and rear suspension load of the front and rear suspensions FS and RS. Preferably, the electronic controller 16 receives detection signals from the front and rear suspension load sensors 30 and 32 that are indicative of changes in amplitude of the air/fluid pressures in the front and rear suspensions FS and RS. In this way, the changes or variations of the air/fluid pressures in the front and rear suspensions FS and RS are not affected by gravity.

Also in FIGS. 12 to 14, the electronic controller 16 does not actually determine the specific riding style of the human-powered vehicle 1, but rather detects traveling conditions detected by the front and rear suspension load sensors 30 and 32, and then adjusts the front and rear suspensions FS and RS to provide a more comfortable ride. The riding conditions (e.g., off-road state, on-road state, jumping state, jack knife state and wheelie state) mentioned herein are merely provided as an image to give a better understanding of a possible detected position or orientation of the human-powered vehicle 1.

In step S40, the electronic controller 16 determines if the front and rear suspensions FS and RS are in the lockout ON states. The electronic controller 16 can determine the lockout states of the front and rear suspensions FS and RS based on a sensor provided on each of the front and rear suspensions FS and RS or can determine the lockout states of the front and rear suspensions FS and RS based on the prior control of the front and rear suspensions FS and RS. If the electronic controller 16 determines the front and rear suspensions FS and RS are in the lockout ON states, then the controller proceeds to step S41 (FIG. 13). On the other hand, if the electronic controller 16 determines the front and rear suspensions FS and RS are in the lockout OFF states, then the controller proceeds to step S50 (FIG. 14).

In step S41, the electronic controller 16 receives detection results that are periodically sent from the front suspension load sensor 30, and then determines if the amplitude of the load of the front suspension load sensor 30 is equal to or exceeds a predetermined threshold value. The predetermined threshold value in step S41 can be set by the user using the input device(s) 14. The predetermined threshold value in step S41 can have a default value that prestored or initial startup value that is equal to or near a detected no-load condition value that at a time that the human-powered vehicle 1 is first starts traveling. If the amplitude of the load of the front suspension load sensor 30 is less than the predetermined threshold value in step S41, then the control process proceeds to step S42. In other words, the amplitude of the front suspension load being less than the predetermined threshold value in step S41 is indicative of the front wheel FW being in a somewhat floating state that can include a wheelie state, a jumping state, or an on-road state. On the other hand, if the amplitude of the load of the front suspension load sensor 30 is equal to or exceeds the predetermined threshold value in step S41, then the control process proceeds to step S47. In other words, if the amplitude of the front suspension load is equal to or exceeds the predetermined threshold value in step S41, then the front wheel FW is in a somewhat ground contact state which is indicative of a riding position that can be considered similar to a jack knife state or an off-road state.

In step S42, the electronic controller 16 receives detection results that are periodically sent from the rear suspension load sensor 32, and then determines if the amplitude of the load of the rear suspension load sensor 32 is equal to or exceeds a predetermined threshold value. The predetermined threshold value in step S42 can be set by the user using the input device(s) 14. The predetermined threshold value in step S42 can have a default value that prestored or initial startup value that is equal to or near a detected no-load condition value that at a time that the human-powered vehicle 1 is first starts traveling. If the amplitude of the load of the rear suspension load sensor 32 is less than the predetermined threshold value in step S42, then the control process proceeds to step S43. In other words, the amplitude of the rear suspension load being less than the predetermined threshold value in step S42 is indicative of the rear wheel RW being in a somewhat floating state that can include a jumping state, or an on-road state. If the amplitude of the load of the rear suspension load sensor 32 is equal to or exceeds the predetermined threshold value in step S42, then the control process proceeds to step S46. In other words, the amplitude of the rear suspension load being equal to or exceeds the predetermined threshold value in step S42 is indicative of the rear wheel being is in a somewhat ground contact state that can be a wheelie state.

In step S43, both the front and rear wheels FW and RW are somewhat floating, and the electronic controller 16 uses the front and rear suspension load sensors 30 and 32 to determine if a load drop is occurring in both the front and rear tires FT and RT. If the electronic controller 16 determines there is no load drop in both the front and rear tires FT and RT, then the control process proceeds to step S44. Thus, a load drop not occurring in both the front and rear tires FT and RT is indicative of the front and rear wheels FW and RW are somewhat floating but can be considered as stable as in on road. On the other hand, if the electronic controller 16 determines there is a load drop in both the front and rear tires FT and RT, then the control process proceeds to step S45. In other words, a load drop occurring in both the front and rear tires FT and RT is indicative of the front and rear wheels FW and RW are both floating.

In step S44, the electronic controller 16 does not output a suspension lockout OFF signal to either the front and rear suspensions FS and RS because the electronic controller 16 has determined no change in the suspension states of the front and rear suspensions FS and RS is desirable based on the front and rear suspension loads.

In step S46, the electronic controller 16 outputs a suspension lockout OFF signal to the front suspension FS but does not output a suspension lockout OFF signal to the rear suspension RS because the electronic controller 16 has determined that it is desirable to have the suspension state of the front suspension FS in the lockout OFF state but not the rear suspension RS based on the front and rear suspension loads. Alternatively, the control setting in step S46 can be changed be the user from the current default setting (e.g., the front suspension FS: lockout OFF; and the rear suspension RS: no change) to a user (rider) setting in which the front suspension FS is not changed (i.e., the lockout ON state) and the rear suspension RS is changed to the lockout OFF state. Some riders may prefer the rear suspension RS in lockout OFF state when in the wheelie riding state.

In step S47, the electronic controller 16 receives detection results that are periodically sent from the rear suspension load sensor 32, and then determines if the amplitude of the load of the rear suspension load sensor 32 is equal to or exceeds a predetermined threshold value. The predetermined threshold value in step S47 can be set by the user using the input device(s) 14. The predetermined threshold value in step S47 can have a default value that prestored or initial startup value that is equal to or near a detected ground contact pressure value that at a time that the human-powered vehicle 1 is first starts traveling. The predetermined threshold values in steps S42 and S47 can be the same value or different values. If the amplitude of the load of the rear suspension load sensor 32 is less than the predetermined threshold value, then the control process proceeds to step S48. In other words, the amplitude of the rear suspension load being less than the predetermined threshold value in step S47 is indicative of the rear wheel RW being in a somewhat floating state that can be a jack knife state. If the amplitude of the load of the rear suspension load sensor 32 is equal to or exceeds the predetermined threshold value, then the control process proceeds to step S49. In other words, the amplitude of the rear suspension load being equal to or exceeds the predetermined threshold value in step S47 is indicative of the rear wheel being is in a somewhat ground contact state that can be an off-road state.

In step S48, the electronic controller 16 does not output a suspension lockout OFF signal to the front suspension FS but outputs a suspension lockout OFF signal to the rear suspension RS because the electronic controller 16 has determined that it is desirable to have the suspension state of the rear suspension RS in the lockout OFF state but not the front suspension FS based on the front and rear suspension loads. Alternatively, the control setting in step S48 can be changed be the user from the current default setting (e.g., the front suspension FS: no change; and the rear suspension RS: lockout OFF) to a user (rider) setting in which the front suspension FS is changed to the lockout OFF state and the rear suspension RS is not changed (i.e., the lockout ON state). Some riders may prefer the rear suspension RS in lockout OFF state when in the jack-knife riding state.

In step S49, the electronic controller 16 outputs a suspension lockout OFF signal to the front suspension FS and outputs a suspension lockout OFF signal to the rear suspension RS because the electronic controller 16 has determined that it is desirable to have the suspension states of the front and rear suspensions FS and RS in the lockout OFF state based on the front and rear suspension loads.

Now, referring to FIG. 14, a flowchart illustrates an automatic suspension control that is executed by the electronic controller 16 of the suspension control device 12 for automatically changing the lockout OFF state of one or both of the front and rear suspensions FS and RS to the lockout ON state in accordance with information (detection results) of the front and rear suspension load sensors 30 and 32. In other words, in executing the control process of FIG. 14, the electronic controller 16 is configured to selectively control a suspension (e.g., one or both of the front and rear suspensions FS and RS) of the human-powered vehicle 1 in accordance with the information detected by a sensor (e.g., the front and rear suspension load sensors 30 and 32). In FIG. 14, the loads of the front and rear suspensions FS and RS is detected by the front and rear suspension load sensors 30 and 32. Thus, air or fluid pressure of the front and rear suspensions FS and RS is used to determine the front and rear suspension load of the front and rear suspensions FS and RS.

In step S50, the electronic controller 16 receives detection results that are periodically sent from the front suspension load sensor 30, and then determines if the amplitude of the load of the front suspension load sensor 30 is equal to or less than a predetermined threshold value. The predetermined threshold value in step S50 can be set by the user using the input device(s) 14. The predetermined threshold value in step S50 can have a default value that prestored or initial startup value that is equal to or near a detected ground contact pressure value that at a time that the human-powered vehicle 1 is first starts traveling. If the amplitude of the load of the front suspension load sensor 30 is greater than the predetermined threshold value, then the control process proceeds to step S51. In other words, the amplitude of the front suspension load being greater the predetermined threshold value in step S50 is indicative of the front wheel FW being in a somewhat ground contact state which is indicative of a riding position that can include a jack knife state or an off-road state. If the amplitude of the load of the front suspension load sensor 30 is equal to or less than the predetermined threshold value, then the control process proceeds to step S54. In other words, the amplitude of the front suspension load being equal to or less than the predetermined threshold value in step S50 is indicative of the front wheel FW being in a somewhat floating state that can include a wheelie state or an on-road state.

In step S51, the electronic controller 16 receives detection results that are periodically sent from the rear suspension load sensor 32, and then determines if the amplitude of the load of the rear suspension load sensor 32 is equal to or less than a predetermined threshold value. The predetermined threshold value in step S51 can be set by the user using the input device(s) 14. The predetermined threshold value in step S51 can have a default value that prestored or initial startup value that is equal to or near a detected ground contact pressure value that at a time that the human-powered vehicle 1 is first starts traveling. If the amplitude of the load of the rear suspension load sensor 32 is greater than the predetermined threshold value, then the control process proceeds to step S52. In other words, the amplitude of the rear suspension load being greater the predetermined threshold value in step S51 is indicative of the rear wheel being is in a somewhat ground contact state that can be an off-road state. If the amplitude of the load of the rear suspension load sensor 32 is equal to or less than the predetermined threshold value, then the control process proceeds to step S53. In other words, the amplitude of the rear suspension load being equal to or less than the predetermined threshold value in step S51 is indicative of the rear wheel RW being in a somewhat floating state that can be a jack knife state.

In step S52, the electronic controller 16 does not output a suspension lockout ON signal to either the front and rear suspensions FS and RS because the electronic controller 16 has determined no change in the suspension states of the front and rear suspensions FS and RS is desirable based on the front and rear suspension loads.

In step S53, the electronic controller 16 does not output a suspension lockout ON signal to either the front and rear suspensions FS and RS because the electronic controller 16 has determined no change in the suspension states of the front and rear suspensions FS and RS is desirable based on the front and rear suspension loads.

In step S54, the electronic controller 16 receives detection results that are periodically sent from the rear suspension load sensor 32, and then determines if the amplitude of the load of the rear suspension load sensor 32 is equal to or less than a predetermined threshold value. The predetermined threshold value in step S54 can be set by the user using the input device(s) 14. The predetermined threshold value in step S54 can have a default value that prestored or initial startup value that is equal to or near a detected ground contact pressure value that at a time that the human-powered vehicle 1 is first starts traveling. If the amplitude of the load of the rear suspension load sensor 32 is greater than the predetermined threshold value, then the control process proceeds to step S55. In other words, the amplitude of the rear suspension load being greater the predetermined threshold value in step S54 is indicative of the rear wheel being is in a somewhat ground contact state that can be a wheelie state. If the amplitude of the load of the rear suspension load sensor 32 is equal to or less than the predetermined threshold value, then the control process proceeds to step S56. In other words, the amplitude of the rear suspension load being equal to or less than the predetermined threshold value in step S54 is indicative of the rear wheel RW being in a somewhat floating state that can be an on-road state.

In step S55, the electronic controller 16 does not output a suspension lockout ON signal to either the front and rear suspensions FS and RS because the electronic controller 16 has determined no change in the suspension states of the front and rear suspensions FS and RS is desirable based on the front and rear suspension loads.

In step S56, the electronic controller 16 outputs a suspension lockout ON signal to the front suspension FS and outputs a suspension lockout ON signal to the rear suspension RS because the electronic controller 16 has determined that it is desirable to have the suspension states of the front and rear suspensions FS and RS in the lockout ON state based on the front and rear suspension loads.

For the flow chart of FIGS. 12 to 14, a subroutine can be provided such that after detecting the "jump state" or "wheelie state" or "jack knife state", the front suspension FS and/or the rear suspension RS can be returned to the original state (i.e. the state occurring immediately prior to the current state) after an excessive impact detected on the floating tire (the acceleration in the vertical direction largely exceeds the reference value).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

The term "on-road" as used herein refers to a road surface with a small change in running load (i.e., change in a tangential force between a tire and a road surface) such as a paved road. The term "off-road" as used herein refers to a road surface with large change in running load like a rocky place or a dirt surface.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the suspension control device. Accordingly, these directional terms, as utilized to describe the suspension control device should be interpreted relative to a bicycle in an upright riding position on a horizontal surface and that is equipped with the suspension control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A suspension control device for a human-powered vehicle, the suspension control device comprising:
   a sensor configured to detect information relating to a ground contact condition, the sensor including a front sensor and a rear sensor; and
   an electronic controller configured to determine the ground contact condition in accordance with the information detected by the front sensor and the rear sensor and selectively control each of at least one of a front suspension and a rear suspension of the human-powered vehicle in accordance with the inhumation detected by the front sensor and the rear sensor, the information including at least one of the front and rear vertical accelerations, the front and rear tire loads, and the front and rear suspension loads, the control of each of the front suspension and the rear suspension being in accordance with a user selectable setting,
   the electronic controller being configured to selectively control a lockout state of at least one of the front suspension and the rear suspension in accordance with the information,
   the lockout state including a lockout ON state and a lockout OFF state,
   the electronic controller being configured to selectively set the lockout state with the lockout OFF state in accordance with the information, and the electronic controller being configured to set the lockout state with the lockout OFF state upon determining the loads are equal to or less than a first predetermined threshold value.

2. The suspension control device according to claim 1, wherein
the front sensor is configured to detect an air compression of a front tire attached to the front wheel as the load of the front wheel.

3. The suspension control device according to claim 1, wherein
the ground contact condition is in accordance with a vertical acceleration of a front wheel of the human-powered vehicle,
the electronic controller is configured to set the lockout state with the lockout OFF state in accordance with a comparison between the vertical acceleration of the front wheel and a second predetermined threshold value.

4. The suspension control device according to claim 1, wherein
the ground contact condition is in accordance with a vertical acceleration of a rear wheel of the human-powered vehicle,
the electronic controller is configured to set the lockout state with the lockout OFF state in accordance with a comparison between the vertical acceleration of the rear wheel and a second predetermined threshold value.

5. The suspension control device according to claim 1, wherein
the user selectable setting includes at least one of a default setting and an automatic setting.

6. A suspension control device for a human-powered vehicle, the suspension control device comprising:
a sensor configured to detect information relating to a ground contact condition, the sensor including a front sensor and a rear sensor, and
an electronic controller configured to selectively control each of at least one of a front suspension and a rear suspension of the human-powered vehicle in accordance with the information detected by the front sensor and the rear sensor, the control of each of the front suspension and the rear suspension being in accordance with a user selectable setting,
the electronic controller being configured to selectively control a lockout state of at least one of the front suspension and the rear suspension in accordance with the information,
the lockout state including a lockout ON state and a lockout OFF state,
the electronic controller being configured to selectively set the lockout state with the lockout OFF state in accordance with the information,
the ground contact condition being in accordance with a load of a rear wheel of the human-powered vehicle, and
the electronic controller being configured to set the lockout state with the lockout-OFF state upon determining the load is equal to or less than a predetermined threshold value.

7. The suspension control device according to claim 6, wherein
the rear sensor is configured to detect an air compression of a rear tire attached to the rear wheel as the load of the rear wheel.

8. The suspension control device according to claim 6, wherein
the rear sensor is configured to detect a load of the rear suspension as the load of the rear wheel.

9. A suspension control device for a human-powered vehicle, the suspension control device comprising:
at least one of a front sensor configured to detect an air pressure of a front tire and a rear sensor configured to detect an air pressure of a rear tire; and
an electronic controller configured to selectively control each of at least one of a front suspension and a rear suspension of the human-powered vehicle in accordance with the tire pressure detected by the at least one of the front sensor and the rear sensor, the tire pressure detected by the at least one of the front and rear sensors being compared to a predetermined front tire pressure and a predetermined rear tire pressure, respectively, the predetermined front and rear tire pressures being configured to be set with an input device connected to the electronic controller.

10. The suspension control device according to claim 9, wherein
the predetermined tire pressures set through the input device include a default tire pressure.

* * * * *